(12) United States Patent
Tidwell et al.

(10) Patent No.: US 11,082,743 B2
(45) Date of Patent: Aug. 3, 2021

(54) APPARATUS AND METHODS FOR ENABLING PRESENCE-BASED AND USE-BASED SERVICES

(71) Applicant: Time Warner Cable Enterprises LLC, St. Louis, MO (US)

(72) Inventors: Justin Tidwell, Waxhaw, NC (US); Eduardo Samame, Rowayton, CT (US)

(73) Assignee: Time Warner Cable Enterprises LLC, St. Louis, MO (US)

(*) Notice: Subject to any disclaimer, the term of this patent is extended or adjusted under 35 U.S.C. 154(b) by 0 days.

(21) Appl. No.: 16/036,779

(22) Filed: Jul. 16, 2018

(65) Prior Publication Data
US 2019/0014381 A1   Jan. 10, 2019

Related U.S. Application Data

(62) Division of application No. 14/500,835, filed on Sep. 29, 2014, now Pat. No. 10,028,025.

(51) Int. Cl.
*H04N 21/45* (2011.01)
*H04N 21/2668* (2011.01)
(Continued)

(52) U.S. Cl.
CPC ..... *H04N 21/4524* (2013.01); *H04N 21/2668* (2013.01); *H04N 21/41407* (2013.01);
(Continued)

(58) Field of Classification Search
None
See application file for complete search history.

(56) References Cited

U.S. PATENT DOCUMENTS

| 4,521,881 A | 6/1985 | Stapleford et al. |
| 4,546,382 A | 10/1985 | McKenna et al. |

(Continued)

FOREIGN PATENT DOCUMENTS

WO   WO-0191474 A2   11/2001

OTHER PUBLICATIONS

Gomez, Conserving Transmission Power in Wireless Ad Hoc Networks, 2001, Network Protocols.
(Continued)

*Primary Examiner* — Fernando Alcon
(74) *Attorney, Agent, or Firm* — Gazdzinski & Associates, PC

(57) ABSTRACT

Apparatus and methods for enabling presence-based and/or use-based services. In one embodiment, a presence database and an evaluation entity collect information relating to a device's location and activity. The presence database collects location-based data to build anonymized user profiles; estimates a physical location of the device; and provides targeted content to the device. The user profiles are stored at e.g., a user premises, or at a headend network or elsewhere within the "cloud". Additionally, in one variant, signals are collected from "smart" appliances (in a home or other premises) to create personal, shared, and family environmental settings which are instantiated when a user enters the premises. Methods and apparatus to collect browsing behavior across desktop and mobile devices on third party sites (including web browsing, social networking, and e-commerce) which are represented by the managed network are also provided.

20 Claims, 10 Drawing Sheets

(51) Int. Cl.
*H04N 21/414* (2011.01)
*H04N 21/442* (2011.01)
*H04N 21/61* (2011.01)
*H04N 21/643* (2011.01)
*H04N 21/81* (2011.01)

(52) U.S. Cl.
CPC . *H04N 21/44218* (2013.01); *H04N 21/44222* (2013.01); *H04N 21/4532* (2013.01); *H04N 21/6125* (2013.01); *H04N 21/64322* (2013.01); *H04N 21/812* (2013.01)

(56) References Cited

U.S. PATENT DOCUMENTS

| | | |
|---|---|---|
| 4,602,279 A | 7/1986 | Freeman |
| 4,905,080 A | 2/1990 | Watanabe et al. |
| 4,930,120 A | 5/1990 | Baxter et al. |
| 5,155,591 A | 10/1992 | Wachob |
| 5,313,454 A | 5/1994 | Bustini et al. |
| 5,373,315 A | 12/1994 | Dufresne et al. |
| 5,481,294 A | 1/1996 | Thomas et al. |
| 5,497,185 A | 3/1996 | Dufresne et al. |
| 5,600,364 A | 2/1997 | Hendricks et al. |
| 5,675,647 A | 10/1997 | Garneau et al. |
| 5,734,720 A * | 3/1998 | Salganicoff .......... G06Q 20/383 348/E7.056 |
| 5,758,257 A | 5/1998 | Herz et al. |
| 5,774,170 A | 6/1998 | Hite et al. |
| 5,793,409 A | 8/1998 | Tetsumura |
| 5,812,642 A | 9/1998 | Leroy |
| 5,862,312 A | 1/1999 | Mann et al. |
| 5,878,324 A | 3/1999 | Borth et al. |
| 5,914,945 A | 6/1999 | Abu-Amara et al. |
| 5,926,205 A | 7/1999 | Krause et al. |
| 5,929,849 A | 7/1999 | Kikinis |
| 5,935,206 A | 8/1999 | Dixon et al. |
| 5,956,037 A | 9/1999 | Osawa et al. |
| 5,963,844 A | 10/1999 | Dail |
| 5,974,299 A | 10/1999 | Massetti |
| 6,002,393 A | 12/1999 | Hite et al. |
| 6,029,045 A | 2/2000 | Picco et al. |
| 6,047,327 A | 4/2000 | Tso et al. |
| 6,081,830 A | 6/2000 | Schindler |
| 6,088,722 A | 7/2000 | Herz et al. |
| 6,092,178 A | 7/2000 | Jindal et al. |
| 6,124,878 A | 9/2000 | Adams et al. |
| 6,128,316 A | 10/2000 | Takeda et al. |
| 6,134,532 A | 10/2000 | Lazarus et al. |
| 6,161,142 A | 12/2000 | Wolfe et al. |
| 6,169,728 B1 | 1/2001 | Perreault et al. |
| 6,177,931 B1 | 1/2001 | Alexander et al. |
| 6,182,050 B1 | 1/2001 | Ballard |
| 6,202,210 B1 | 3/2001 | Ludtke |
| 6,211,901 B1 | 4/2001 | Imajima et al. |
| 6,216,129 B1 | 4/2001 | Eldering |
| 6,219,840 B1 | 4/2001 | Corrigan et al. |
| 6,240,553 B1 | 5/2001 | Son et al. |
| 6,249,680 B1 | 6/2001 | Wax et al. |
| 6,272,176 B1 | 8/2001 | Srinivasan |
| 6,282,713 B1 | 8/2001 | Kitsukawa et al. |
| 6,330,609 B1 | 12/2001 | Garofalakis et al. |
| 6,353,626 B1 | 3/2002 | Sunay et al. |
| 6,359,711 B1 | 3/2002 | Cole et al. |
| 6,378,130 B1 | 4/2002 | Adams |
| 6,385,454 B1 * | 5/2002 | Bahl ..................... H04W 28/26 455/440 |
| 6,389,538 B1 | 5/2002 | Gruse et al. |
| 6,396,055 B1 | 5/2002 | Biedendorf |
| 6,434,141 B1 | 8/2002 | Oz et al. |
| 6,446,261 B1 | 9/2002 | Rosser |
| 6,463,585 B1 | 10/2002 | Hendricks et al. |
| 6,467,089 B1 | 10/2002 | Aust et al. |
| 6,498,783 B1 | 12/2002 | Lin |
| 6,502,076 B1 | 12/2002 | Smith |
| 6,549,718 B1 | 4/2003 | Grooters et al. |
| 6,560,578 B1 | 5/2003 | Eldering |
| 6,590,865 B1 | 7/2003 | Ibaraki et al. |
| 6,601,237 B1 | 7/2003 | Ten et al. |
| 6,604,138 B1 | 8/2003 | Virine et al. |
| 6,615,039 B1 | 9/2003 | Eldering |
| 6,615,251 B1 | 9/2003 | Klug et al. |
| 6,647,548 B1 | 11/2003 | Lu et al. |
| 6,671,736 B2 | 12/2003 | Virine et al. |
| 6,681,393 B1 | 1/2004 | Bauminger et al. |
| 6,687,735 B1 | 2/2004 | Logston et al. |
| 6,700,624 B2 | 3/2004 | Yun |
| 6,704,930 B1 | 3/2004 | Eldering et al. |
| 6,711,148 B1 | 3/2004 | Hills |
| 6,718,551 B1 | 4/2004 | Swix et al. |
| 6,725,461 B1 | 4/2004 | Dougherty et al. |
| 6,738,978 B1 | 5/2004 | Hendricks et al. |
| 6,742,187 B1 | 5/2004 | Vogel |
| 6,763,391 B1 | 7/2004 | Ludtke |
| 6,771,290 B1 | 8/2004 | Hoyle |
| 6,775,843 B1 | 8/2004 | McDermott |
| 6,813,776 B2 | 11/2004 | Chernock et al. |
| 6,842,783 B1 | 1/2005 | Boivie et al. |
| 6,859,845 B2 | 2/2005 | Mate |
| 6,891,841 B2 | 5/2005 | Leatherbury et al. |
| 6,898,762 B2 | 5/2005 | Ellis et al. |
| 6,901,606 B2 | 5/2005 | Wright et al. |
| 6,909,837 B1 | 6/2005 | Unger |
| 6,915,528 B1 | 7/2005 | McKenna, Jr. |
| 6,986,156 B1 | 1/2006 | Rodriguez et al. |
| 6,990,680 B1 | 1/2006 | Wugofski |
| 7,007,170 B2 | 2/2006 | Morten |
| 7,017,179 B1 | 3/2006 | Asamoto et al. |
| 7,024,676 B1 | 4/2006 | Klopfenstein |
| 7,039,928 B2 | 5/2006 | Kamada et al. |
| 7,065,216 B1 | 6/2006 | Benaloh et al. |
| 7,069,573 B1 | 6/2006 | Brooks et al. |
| 7,075,945 B2 | 7/2006 | Arsenault et al. |
| 7,086,077 B2 | 8/2006 | Giammaressi |
| 7,100,183 B2 | 8/2006 | Kunkel et al. |
| 7,109,848 B2 | 9/2006 | Schybergson |
| 7,143,431 B1 | 11/2006 | Eager et al. |
| 7,146,627 B1 | 12/2006 | Ismail et al. |
| 7,152,237 B2 | 12/2006 | Flickinger et al. |
| 7,155,508 B2 | 12/2006 | Sankuratripati et al. |
| 7,165,268 B1 | 1/2007 | Moore et al. |
| 7,174,126 B2 | 2/2007 | McElhatten et al. |
| 7,191,461 B1 | 3/2007 | Arsenault et al. |
| 7,197,472 B2 | 3/2007 | Conkwright et al. |
| 7,213,036 B2 | 5/2007 | Apparao et al. |
| 7,222,078 B2 | 5/2007 | Abelow |
| 7,228,555 B2 | 6/2007 | Schlack |
| 7,237,250 B2 | 6/2007 | Kanojia et al. |
| 7,240,355 B1 * | 7/2007 | Eldering ............ H04N 21/2353 348/E5.002 |
| 7,242,988 B1 | 7/2007 | Hoffberg et al. |
| 7,246,150 B1 | 7/2007 | Donoho et al. |
| 7,246,172 B2 | 7/2007 | Yoshiba et al. |
| 7,248,694 B2 | 7/2007 | Husemann et al. |
| 7,266,836 B2 | 9/2007 | Anttila et al. |
| 7,280,737 B2 | 10/2007 | Smith |
| 7,281,261 B2 | 10/2007 | Jaff et al. |
| 7,308,415 B2 | 12/2007 | Kimbrel et al. |
| 7,317,728 B2 | 1/2008 | Acharya et al. |
| 7,327,692 B2 | 2/2008 | Ain et al. |
| 7,334,044 B1 | 2/2008 | Allen |
| 7,340,759 B1 | 3/2008 | Rodriguez |
| 7,346,688 B2 | 3/2008 | Allen et al. |
| 7,352,775 B2 | 4/2008 | Powell |
| 7,353,543 B2 | 4/2008 | Ohmori et al. |
| 7,355,980 B2 | 4/2008 | Bauer et al. |
| 7,356,751 B2 | 4/2008 | Levitan |
| 7,357,775 B1 | 4/2008 | Koh |
| 7,363,371 B2 | 4/2008 | Kirby et al. |
| 7,363,643 B2 | 4/2008 | Drake et al. |
| 7,367,043 B2 | 4/2008 | Dudkiewicz et al. |
| 7,369,750 B2 | 5/2008 | Cheng et al. |
| 7,379,494 B2 | 5/2008 | Raleigh et al. |
| 7,444,655 B2 | 10/2008 | Sardera |

(56) References Cited

U.S. PATENT DOCUMENTS

| | | |
|---|---|---|
| 7,457,520 B2 | 11/2008 | Rossetti et al. |
| 7,464,179 B2 | 12/2008 | Hodges et al. |
| 7,487,363 B2 | 2/2009 | Alve et al. |
| 7,567,565 B2 | 7/2009 | La |
| 7,567,983 B2 | 7/2009 | Pickelsimer et al. |
| 7,577,118 B2 | 8/2009 | Haumonte et al. |
| 7,602,820 B2 | 10/2009 | Helms et al. |
| 7,603,529 B1 | 10/2009 | MacHardy et al. |
| 7,650,319 B2 | 1/2010 | Hoffberg, I et al. |
| 7,712,125 B2 | 5/2010 | Herigstad et al. |
| 7,720,432 B1 | 5/2010 | Colby et al. |
| 7,729,940 B2 | 6/2010 | Harvey et al. |
| 7,730,509 B2 | 6/2010 | Boulet et al. |
| 7,783,316 B1 | 8/2010 | Mitchell |
| 7,801,803 B2 | 9/2010 | Forlai |
| 7,870,599 B2 | 1/2011 | Pemmaraju |
| 7,900,052 B2 | 3/2011 | Jonas et al. |
| 7,900,229 B2 | 3/2011 | Dureau |
| 7,930,558 B2 | 4/2011 | Hori |
| 7,930,715 B2 | 4/2011 | Hendricks et al. |
| 7,954,131 B2 | 5/2011 | Cholas et al. |
| 8,010,691 B2 | 8/2011 | Kollmansberger et al. |
| 8,028,322 B2 | 9/2011 | Riedl et al. |
| 8,041,785 B2 | 10/2011 | Mazur et al. |
| 8,042,131 B2 | 10/2011 | Flickinger |
| 8,065,703 B2 | 11/2011 | Wilson et al. |
| 8,073,460 B1 * | 12/2011 | Scofield ............ H04M 3/4878 455/456.1 |
| 8,084,792 B2 | 12/2011 | Lehmann et al. |
| 8,099,757 B2 | 1/2012 | Riedl et al. |
| 8,205,226 B2 | 6/2012 | Ko et al. |
| 8,214,256 B2 | 7/2012 | Riedl et al. |
| 8,228,818 B2 | 7/2012 | Chase et al. |
| 8,296,185 B2 | 10/2012 | Isaac |
| 8,306,634 B2 | 11/2012 | Nguyen et al. |
| 8,341,242 B2 | 12/2012 | Dillon et al. |
| 8,347,341 B2 | 1/2013 | Markley et al. |
| 8,365,213 B1 | 1/2013 | Orlowski |
| 8,380,226 B2 | 2/2013 | Clipsham |
| 8,396,055 B2 | 3/2013 | Patel et al. |
| 8,396,056 B2 | 3/2013 | Dalton, Jr. et al. |
| 8,442,265 B1 | 5/2013 | Bosworth et al. |
| 8,484,511 B2 | 7/2013 | Engel et al. |
| 8,516,529 B2 | 8/2013 | Lajoie et al. |
| 8,561,113 B2 | 10/2013 | Cansler, Jr. et al. |
| 8,571,931 B2 | 10/2013 | Riedl et al. |
| 8,583,484 B1 | 11/2013 | Chalawsky et al. |
| 8,621,501 B2 | 12/2013 | Matheny et al. |
| 8,713,623 B2 | 4/2014 | Brooks |
| 8,769,559 B2 | 7/2014 | Moon et al. |
| 8,856,825 B1 | 10/2014 | Mick, Jr. et al. |
| 8,862,155 B2 | 10/2014 | Stern et al. |
| 8,863,164 B1 | 10/2014 | Mick et al. |
| 8,866,911 B1 | 10/2014 | Sivertsen |
| 8,898,270 B1 | 11/2014 | Stack et al. |
| 8,997,136 B2 | 3/2015 | Brooks et al. |
| 9,003,436 B2 | 4/2015 | Tidwell et al. |
| 9,027,062 B2 | 5/2015 | Patel et al. |
| 9,071,859 B2 | 6/2015 | Lajoie |
| 9,215,423 B2 | 12/2015 | Kimble et al. |
| 9,479,807 B1 | 10/2016 | Bugajski et al. |
| 2001/0001160 A1 | 5/2001 | Shoff et al. |
| 2001/0013123 A1 | 8/2001 | Freeman et al. |
| 2001/0030785 A1 | 10/2001 | Pangrac et al. |
| 2002/0013772 A1 | 1/2002 | Peinado |
| 2002/0026496 A1 | 2/2002 | Boyer et al. |
| 2002/0032754 A1 | 3/2002 | Logston et al. |
| 2002/0049902 A1 | 4/2002 | Rhodes |
| 2002/0054589 A1 | 5/2002 | Ethridge et al. |
| 2002/0059577 A1 | 5/2002 | Lu et al. |
| 2002/0059619 A1 | 5/2002 | Lebar |
| 2002/0063621 A1 | 5/2002 | Tseng et al. |
| 2002/0069404 A1 | 6/2002 | Copeman et al. |
| 2002/0073419 A1 | 6/2002 | Yen et al. |
| 2002/0078441 A1 | 6/2002 | Drake et al. |
| 2002/0078444 A1 | 6/2002 | Krewin et al. |
| 2002/0087975 A1 | 7/2002 | Schlack |
| 2002/0087976 A1 | 7/2002 | Kaplan et al. |
| 2002/0095684 A1 | 7/2002 | St. John et al. |
| 2002/0100063 A1 | 7/2002 | Herigstad et al. |
| 2002/0104083 A1 | 8/2002 | Hendricks et al. |
| 2002/0112240 A1 | 8/2002 | Bacso et al. |
| 2002/0120498 A1 | 8/2002 | Gordon et al. |
| 2002/0123928 A1 | 9/2002 | Eldering et al. |
| 2002/0124182 A1 | 9/2002 | Bacso et al. |
| 2002/0129378 A1 | 9/2002 | Cloonan et al. |
| 2002/0144263 A1 | 10/2002 | Eldering et al. |
| 2002/0147984 A1 | 10/2002 | Tomsen et al. |
| 2002/0152393 A1 | 10/2002 | Thoma et al. |
| 2002/0154655 A1 | 10/2002 | Gummalla et al. |
| 2002/0163928 A1 | 11/2002 | Rudnick et al. |
| 2002/0166119 A1 | 11/2002 | Cristofalo |
| 2002/0174430 A1 | 11/2002 | Ellis et al. |
| 2002/0178445 A1 | 11/2002 | Eldering et al. |
| 2002/0178447 A1 | 11/2002 | Plotnick et al. |
| 2002/0184629 A1 | 12/2002 | Sie et al. |
| 2002/0184634 A1 | 12/2002 | Cooper |
| 2002/0184635 A1 | 12/2002 | Istvan |
| 2003/0002862 A1 | 1/2003 | Rodriguez et al. |
| 2003/0004810 A1 | 1/2003 | Eldering |
| 2003/0005446 A1 | 1/2003 | Jaff et al. |
| 2003/0005453 A1 | 1/2003 | Rodriguez et al. |
| 2003/0007516 A1 | 1/2003 | Abramov et al. |
| 2003/0018977 A1 | 1/2003 | McKenna |
| 2003/0020744 A1 | 1/2003 | Ellis et al. |
| 2003/0030751 A1 | 2/2003 | Lupulescu et al. |
| 2003/0033199 A1 | 2/2003 | Coleman |
| 2003/0046704 A1 | 3/2003 | Laksono et al. |
| 2003/0056217 A1 | 3/2003 | Brooks |
| 2003/0061619 A1 | 3/2003 | Giammaressi |
| 2003/0071117 A1 | 4/2003 | Meade |
| 2003/0077067 A1 | 4/2003 | Wu et al. |
| 2003/0093311 A1 | 5/2003 | Knowlson |
| 2003/0093784 A1 | 5/2003 | Dimitrova et al. |
| 2003/0093790 A1 | 5/2003 | Logan et al. |
| 2003/0093792 A1 | 5/2003 | Labeeb et al. |
| 2003/0101449 A1 | 5/2003 | Bentolila et al. |
| 2003/0101451 A1 | 5/2003 | Bentolila et al. |
| 2003/0101454 A1 | 5/2003 | Ozer et al. |
| 2003/0110499 A1 | 6/2003 | Knudson et al. |
| 2003/0110503 A1 | 6/2003 | Perkes |
| 2003/0114162 A1 | 6/2003 | Chheda et al. |
| 2003/0115601 A1 | 6/2003 | Palazzo et al. |
| 2003/0115612 A1 | 6/2003 | Mao et al. |
| 2003/0135513 A1 | 7/2003 | Quinn et al. |
| 2003/0139980 A1 | 7/2003 | Hamilton |
| 2003/0140351 A1 | 7/2003 | Hoarty et al. |
| 2003/0145323 A1 | 7/2003 | Hendricks et al. |
| 2003/0149975 A1 | 8/2003 | Eldering et al. |
| 2003/0149990 A1 | 8/2003 | Anttila et al. |
| 2003/0149993 A1 | 8/2003 | Son et al. |
| 2003/0163739 A1 | 8/2003 | Armington et al. |
| 2003/0172376 A1 | 9/2003 | Coffin |
| 2003/0174838 A1 | 9/2003 | Bremer |
| 2003/0179773 A1 | 9/2003 | Mocek et al. |
| 2003/0192060 A1 | 10/2003 | Levy et al. |
| 2003/0204602 A1 | 10/2003 | Hudson et al. |
| 2003/0208767 A1 * | 11/2003 | Williamson ......... G06F 3/0482 725/93 |
| 2003/0217365 A1 | 11/2003 | Caputo |
| 2003/0220100 A1 | 11/2003 | McElhatten et al. |
| 2003/0221100 A1 * | 11/2003 | Russ ................. H04L 12/2805 713/153 |
| 2003/0229681 A1 | 12/2003 | Levitan |
| 2003/0237090 A1 | 12/2003 | Boston et al. |
| 2004/0019691 A1 | 1/2004 | Daymond et al. |
| 2004/0034873 A1 | 2/2004 | Zenoni |
| 2004/0047599 A1 | 3/2004 | Grzeczkowski |
| 2004/0060076 A1 | 3/2004 | Song |
| 2004/0073915 A1 | 4/2004 | Dureau |
| 2004/0078809 A1 | 4/2004 | Drazin |
| 2004/0109569 A1 | 6/2004 | Ellison et al. |
| 2004/0109672 A1 | 6/2004 | Kim et al. |
| 2004/0117817 A1 | 6/2004 | Kwon et al. |

(56) References Cited

U.S. PATENT DOCUMENTS

| | | |
|---|---|---|
| 2004/0133467 A1 | 7/2004 | Siler |
| 2004/0133907 A1 | 7/2004 | Rodriguez et al. |
| 2004/0138909 A1 | 7/2004 | Mayer |
| 2004/0146006 A1 | 7/2004 | Jackson |
| 2004/0148625 A1 | 7/2004 | Eldering et al. |
| 2004/0163109 A1 | 8/2004 | Kang et al. |
| 2004/0163111 A1 | 8/2004 | Palazzo et al. |
| 2004/0166881 A1 | 8/2004 | Farchmin et al. |
| 2004/0177383 A1 | 9/2004 | Martinolich et al. |
| 2004/0181811 A1 | 9/2004 | Rakib |
| 2004/0186774 A1 | 9/2004 | Lee |
| 2004/0187159 A1 | 9/2004 | Gaydos et al. |
| 2004/0193609 A1 | 9/2004 | Phan et al. |
| 2004/0194134 A1 | 9/2004 | Gunatilake et al. |
| 2004/0199789 A1 | 10/2004 | Shaw et al. |
| 2004/0230994 A1 | 11/2004 | Urdang et al. |
| 2005/0007278 A1 | 1/2005 | Anson et al. |
| 2005/0022237 A1 | 1/2005 | Nomura |
| 2005/0027696 A1 | 2/2005 | Swaminathan et al. |
| 2005/0028208 A1 | 2/2005 | Ellis et al. |
| 2005/0034171 A1 | 2/2005 | Benya |
| 2005/0034173 A1 | 2/2005 | Hatanaka |
| 2005/0039205 A1 | 2/2005 | Riedl |
| 2005/0047596 A1 | 3/2005 | Suzuki |
| 2005/0055685 A1 | 3/2005 | Maynard et al. |
| 2005/0060742 A1 | 3/2005 | Riedl et al. |
| 2005/0060745 A1 | 3/2005 | Riedl et al. |
| 2005/0066339 A1* | 3/2005 | Thoen ............ H04N 21/234309 |
| | | 719/328 |
| 2005/0086334 A1 | 4/2005 | Aaltonen et al. |
| 2005/0086691 A1 | 4/2005 | Dudkiewicz et al. |
| 2005/0091173 A1 | 4/2005 | Alve |
| 2005/0105396 A1 | 5/2005 | Schybergson |
| 2005/0111844 A1 | 5/2005 | Compton et al. |
| 2005/0114141 A1 | 5/2005 | Grody |
| 2005/0114686 A1 | 5/2005 | Ball et al. |
| 2005/0114900 A1 | 5/2005 | Ladd et al. |
| 2005/0123001 A1 | 6/2005 | Craven et al. |
| 2005/0125832 A1 | 6/2005 | Jost et al. |
| 2005/0144635 A1 | 6/2005 | Boortz et al. |
| 2005/0168323 A1 | 8/2005 | Lenoir et al. |
| 2005/0176444 A1 | 8/2005 | Tanaka |
| 2005/0198686 A1 | 9/2005 | Krause et al. |
| 2005/0210502 A1 | 9/2005 | Flickinger et al. |
| 2005/0223409 A1 | 10/2005 | Rautila et al. |
| 2005/0229209 A1 | 10/2005 | Hildebolt et al. |
| 2005/0234998 A1 | 10/2005 | Lesandrini et al. |
| 2005/0235318 A1 | 10/2005 | Grauch et al. |
| 2005/0262542 A1 | 11/2005 | Deweese et al. |
| 2005/0268107 A1 | 12/2005 | Harris et al. |
| 2005/0273629 A1 | 12/2005 | Abrams et al. |
| 2005/0273819 A1 | 12/2005 | Knudson et al. |
| 2005/0276284 A1 | 12/2005 | Krause et al. |
| 2005/0289588 A1 | 12/2005 | Kinnear |
| 2005/0289618 A1 | 12/2005 | Hardin |
| 2005/0289619 A1 | 12/2005 | Melby |
| 2006/0004662 A1 | 1/2006 | Nadalin et al. |
| 2006/0019702 A1 | 1/2006 | Anttila et al. |
| 2006/0031883 A1 | 2/2006 | Ellis et al. |
| 2006/0036488 A1 | 2/2006 | Golan et al. |
| 2006/0036750 A1 | 2/2006 | Ladd et al. |
| 2006/0037060 A1 | 2/2006 | Simms et al. |
| 2006/0080408 A1 | 4/2006 | Istvan et al. |
| 2006/0117341 A1 | 6/2006 | Park |
| 2006/0130107 A1 | 6/2006 | Gonder et al. |
| 2006/0130113 A1 | 6/2006 | Carlucci et al. |
| 2006/0154674 A1 | 7/2006 | Landschaft et al. |
| 2006/0165197 A1 | 7/2006 | Morita et al. |
| 2006/0171390 A1 | 8/2006 | La |
| 2006/0171423 A1 | 8/2006 | Helms et al. |
| 2006/0190336 A1 | 8/2006 | Pisaris-Henderson et al. |
| 2006/0197828 A1 | 9/2006 | Zeng et al. |
| 2006/0218604 A1 | 9/2006 | Riedl et al. |
| 2006/0218632 A1 | 9/2006 | Corley et al. |
| 2006/0236131 A1 | 10/2006 | Vauclair |
| 2006/0248555 A1 | 11/2006 | Eldering |
| 2006/0253328 A1 | 11/2006 | Kohli et al. |
| 2006/0253584 A1 | 11/2006 | Dixon et al. |
| 2006/0253864 A1 | 11/2006 | Easty |
| 2006/0259924 A1 | 11/2006 | Boortz et al. |
| 2006/0277098 A1 | 12/2006 | Chung et al. |
| 2006/0277569 A1 | 12/2006 | Smith |
| 2006/0288374 A1 | 12/2006 | Ferris et al. |
| 2006/0294259 A1 | 12/2006 | Matefi et al. |
| 2007/0022459 A1 | 1/2007 | Gaebel, Jr. et al. |
| 2007/0029379 A1 | 2/2007 | Peyer |
| 2007/0033531 A1 | 2/2007 | Marsh |
| 2007/0061023 A1 | 3/2007 | Hoffberg et al. |
| 2007/0061197 A1* | 3/2007 | Ramer ................ G06Q 30/02 |
| | | 705/14.64 |
| 2007/0074258 A1 | 3/2007 | Wood et al. |
| 2007/0076696 A1 | 4/2007 | An et al. |
| 2007/0076728 A1 | 4/2007 | Rieger et al. |
| 2007/0089127 A1 | 4/2007 | Flickinger et al. |
| 2007/0094691 A1 | 4/2007 | Gazdzinski |
| 2007/0101370 A1 | 5/2007 | Calderwood |
| 2007/0113243 A1 | 5/2007 | Brey |
| 2007/0115389 A1 | 5/2007 | McCarthy et al. |
| 2007/0118852 A1 | 5/2007 | Calderwood |
| 2007/0150919 A1 | 6/2007 | Morishita |
| 2007/0157242 A1 | 7/2007 | Cordray et al. |
| 2007/0157262 A1 | 7/2007 | Ramaswamy et al. |
| 2007/0180230 A1 | 8/2007 | Cortez |
| 2007/0204310 A1 | 8/2007 | Hua et al. |
| 2007/0217436 A1 | 9/2007 | Markley et al. |
| 2007/0233857 A1 | 10/2007 | Cheng et al. |
| 2007/0244760 A1 | 10/2007 | Bodnar et al. |
| 2007/0266395 A1 | 11/2007 | Lee et al. |
| 2007/0276926 A1 | 11/2007 | Lajoie et al. |
| 2007/0276928 A1 | 11/2007 | Rhoads et al. |
| 2007/0280298 A1 | 12/2007 | Hearn et al. |
| 2007/0294178 A1 | 12/2007 | Pinder et al. |
| 2008/0016526 A1 | 1/2008 | Asmussen |
| 2008/0021836 A1 | 1/2008 | Lao |
| 2008/0052157 A1 | 2/2008 | Kadambi et al. |
| 2008/0092181 A1 | 4/2008 | Britt |
| 2008/0101460 A1 | 5/2008 | Rodriguez |
| 2008/0104634 A1 | 5/2008 | Gajdos et al. |
| 2008/0109307 A1 | 5/2008 | Ullah |
| 2008/0115169 A1 | 5/2008 | Ellis et al. |
| 2008/0124056 A1 | 5/2008 | Concotelli |
| 2008/0134274 A1 | 6/2008 | Derrenberger et al. |
| 2008/0141317 A1 | 6/2008 | Radloff et al. |
| 2008/0141353 A1 | 6/2008 | Brown |
| 2008/0147497 A1 | 6/2008 | Tischer |
| 2008/0155588 A1 | 6/2008 | Roberts et al. |
| 2008/0155614 A1 | 6/2008 | Cooper et al. |
| 2008/0163305 A1 | 7/2008 | Johnson et al. |
| 2008/0170551 A1 | 7/2008 | Zaks |
| 2008/0182591 A1 | 7/2008 | Krikorian |
| 2008/0183705 A1 | 7/2008 | Shivaji-Rao et al. |
| 2008/0192770 A1 | 8/2008 | Burrows et al. |
| 2008/0192820 A1 | 8/2008 | Brooks et al. |
| 2008/0229354 A1 | 9/2008 | Morris et al. |
| 2008/0244667 A1 | 10/2008 | Osborne |
| 2008/0263578 A1 | 10/2008 | Bayer et al. |
| 2008/0271068 A1 | 10/2008 | Ou et al. |
| 2008/0273591 A1 | 11/2008 | Brooks et al. |
| 2008/0306903 A1 | 12/2008 | Larson et al. |
| 2008/0313671 A1 | 12/2008 | Batrouny et al. |
| 2008/0313691 A1 | 12/2008 | Cholas et al. |
| 2009/0025027 A1 | 1/2009 | Craner |
| 2009/0025075 A1 | 1/2009 | Chow et al. |
| 2009/0030802 A1 | 1/2009 | Plotnick et al. |
| 2009/0064251 A1 | 3/2009 | Savoor et al. |
| 2009/0086643 A1 | 4/2009 | Kotrla et al. |
| 2009/0132346 A1 | 5/2009 | Duggal et al. |
| 2009/0133048 A1 | 5/2009 | Gibbs et al. |
| 2009/0150917 A1 | 6/2009 | Huffman et al. |
| 2009/0170479 A1 | 7/2009 | Jarenskog |
| 2009/0187939 A1 | 7/2009 | Lajoie |
| 2009/0210899 A1 | 8/2009 | Lawrence-Apfelbaum et al. |
| 2009/0216761 A1 | 8/2009 | Raichelgauz et al. |
| 2009/0244290 A1 | 10/2009 | McKelvey et al. |

(56) References Cited

U.S. PATENT DOCUMENTS

| | | |
|---|---|---|
| 2009/0319379 A1 | 12/2009 | Joao |
| 2009/0320059 A1 | 12/2009 | Bolyukh |
| 2010/0005527 A1 | 1/2010 | Jeon |
| 2010/0014496 A1 | 1/2010 | Kalika et al. |
| 2010/0027560 A1 | 2/2010 | Yang et al. |
| 2010/0070867 A1 | 3/2010 | Lemmers |
| 2010/0081416 A1 | 4/2010 | Cohen |
| 2010/0082983 A1 | 4/2010 | Shah et al. |
| 2010/0115091 A1 | 5/2010 | Park et al. |
| 2010/0122276 A1 | 5/2010 | Chen |
| 2010/0122288 A1 | 5/2010 | Minter et al. |
| 2010/0125658 A1 | 5/2010 | Strasters |
| 2010/0150027 A1 | 6/2010 | Atwal et al. |
| 2010/0151816 A1 | 6/2010 | Besehanic et al. |
| 2010/0153544 A1 | 6/2010 | Krassner et al. |
| 2010/0159951 A1 | 6/2010 | Shkedi |
| 2010/0161492 A1 | 6/2010 | Harvey et al. |
| 2010/0175084 A1 | 7/2010 | Ellis et al. |
| 2010/0175584 A1 | 7/2010 | Kusaka et al. |
| 2010/0218231 A1 | 8/2010 | Frink et al. |
| 2010/0251304 A1 | 9/2010 | Donoghue et al. |
| 2010/0251305 A1 | 9/2010 | Kimble et al. |
| 2010/0262488 A1 | 10/2010 | Harrison et al. |
| 2010/0269131 A1 | 10/2010 | Newberry et al. |
| 2010/0280641 A1 | 11/2010 | Harkness et al. |
| 2010/0293165 A1 | 11/2010 | Eldering et al. |
| 2010/0299757 A1* | 11/2010 | Lee .................. G06F 21/88 726/26 |
| 2010/0309051 A1 | 12/2010 | Moshfeghi |
| 2010/0313225 A1 | 12/2010 | Cholas et al. |
| 2010/0313226 A1 | 12/2010 | Cholas et al. |
| 2011/0015989 A1 | 1/2011 | Tidwell et al. |
| 2011/0016479 A1 | 1/2011 | Tidwell et al. |
| 2011/0016482 A1 | 1/2011 | Tidwell et al. |
| 2011/0090898 A1 | 4/2011 | Patel et al. |
| 2011/0093900 A1 | 4/2011 | Patel et al. |
| 2011/0099017 A1 | 4/2011 | Ure |
| 2011/0103374 A1 | 5/2011 | Lajoie et al. |
| 2011/0107364 A1 | 5/2011 | Lajoie et al. |
| 2011/0107379 A1 | 5/2011 | Lajoie et al. |
| 2011/0107389 A1 | 5/2011 | Chakarapani |
| 2011/0110515 A1 | 5/2011 | Tidwell et al. |
| 2011/0112717 A1 | 5/2011 | Resner |
| 2011/0138064 A1 | 6/2011 | Rieger et al. |
| 2011/0163888 A1 | 7/2011 | Goedde |
| 2011/0167440 A1 | 7/2011 | Greenfield |
| 2011/0178880 A1 | 7/2011 | Karaoguz et al. |
| 2011/0178943 A1 | 7/2011 | Motahari et al. |
| 2011/0197070 A1 | 8/2011 | Mizrah |
| 2011/0197224 A1 | 8/2011 | Meijer |
| 2011/0206136 A1 | 8/2011 | Bekedam et al. |
| 2011/0225619 A1 | 9/2011 | Kesireddy et al. |
| 2011/0231265 A1 | 9/2011 | Brown et al. |
| 2011/0235577 A1 | 9/2011 | Hintermeister et al. |
| 2011/0247029 A1 | 10/2011 | Yarvis et al. |
| 2011/0264530 A1 | 10/2011 | Santangelo et al. |
| 2011/0265116 A1 | 10/2011 | Stern et al. |
| 2011/0286437 A1 | 11/2011 | Austin et al. |
| 2011/0307339 A1 | 12/2011 | Russell et al. |
| 2011/0317977 A1 | 12/2011 | Harris |
| 2012/0005527 A1* | 1/2012 | Engel .................. H04H 60/64 714/15 |
| 2012/0011269 A1 | 1/2012 | Krikorian et al. |
| 2012/0023535 A1 | 1/2012 | Brooks et al. |
| 2012/0030363 A1 | 2/2012 | Conrad |
| 2012/0030716 A1 | 2/2012 | Zhang et al. |
| 2012/0046049 A1 | 2/2012 | Curtis et al. |
| 2012/0054785 A1 | 3/2012 | Yang et al. |
| 2012/0079546 A1 | 3/2012 | Kalidindi et al. |
| 2012/0084813 A1 | 4/2012 | Dmitriev et al. |
| 2012/0110620 A1 | 5/2012 | Kilar et al. |
| 2012/0115501 A1 | 5/2012 | Zheng |
| 2012/0124606 A1 | 5/2012 | Tidwell et al. |
| 2012/0151549 A1 | 6/2012 | Kumar et al. |
| 2012/0159603 A1 | 6/2012 | Queck |
| 2012/0167173 A1 | 6/2012 | Nadalin et al. |
| 2012/0202447 A1 | 8/2012 | Edge et al. |
| 2012/0203853 A1 | 8/2012 | Davis et al. |
| 2012/0222081 A1 | 8/2012 | Schaefer et al. |
| 2012/0302259 A1 | 11/2012 | Busch |
| 2012/0310762 A1 | 12/2012 | Robbin et al. |
| 2012/0324552 A1 | 12/2012 | Padala et al. |
| 2012/0330759 A1 | 12/2012 | Aggarwal et al. |
| 2013/0023247 A1 | 1/2013 | Bolon et al. |
| 2013/0045681 A1 | 2/2013 | Dua |
| 2013/0046623 A1 | 2/2013 | Moritz et al. |
| 2013/0060385 A1* | 3/2013 | Leen .................. G05D 23/1917 700/276 |
| 2013/0081097 A1 | 3/2013 | Park et al. |
| 2013/0095848 A1 | 4/2013 | Gold et al. |
| 2013/0100818 A1 | 4/2013 | Qiu et al. |
| 2013/0227283 A1 | 8/2013 | Williamson et al. |
| 2013/0227608 A1 | 8/2013 | Evans et al. |
| 2013/0254787 A1 | 9/2013 | Cox et al. |
| 2013/0275557 A1 | 10/2013 | Myers et al. |
| 2013/0325995 A1* | 12/2013 | Ispas .................. H04L 12/12 709/208 |
| 2013/0326554 A1* | 12/2013 | Shkedi .................. H04N 21/25808 725/34 |
| 2013/0347089 A1 | 12/2013 | Bailey et al. |
| 2014/0020017 A1 | 1/2014 | Stern et al. |
| 2014/0046624 A1 | 2/2014 | Miettinen |
| 2014/0066098 A1 | 3/2014 | Stern et al. |
| 2014/0129351 A1 | 5/2014 | Ringdahl |
| 2014/0129352 A1 | 5/2014 | Ringdahl |
| 2014/0150014 A1 | 5/2014 | Aitken et al. |
| 2014/0150019 A1 | 5/2014 | Ma et al. |
| 2014/0215506 A1 | 7/2014 | Kalmes et al. |
| 2014/0282721 A1 | 9/2014 | Kuncl et al. |
| 2014/0309868 A1 | 10/2014 | Ricci |
| 2014/0359649 A1 | 12/2014 | Cronk et al. |
| 2015/0019982 A1 | 1/2015 | Petitt, Jr. et al. |
| 2015/0032550 A1 | 1/2015 | Shah et al. |
| 2015/0058883 A1 | 2/2015 | Tidwell et al. |
| 2015/0058909 A1 | 2/2015 | Miller et al. |
| 2015/0094098 A1 | 4/2015 | Stern et al. |
| 2015/0103685 A1 | 4/2015 | Butchko et al. |
| 2015/0106846 A1 | 4/2015 | Chen et al. |
| 2015/0185993 A1* | 7/2015 | Wheatley .................. G06F 3/0484 715/744 |
| 2015/0189377 A1 | 7/2015 | Wheatley et al. |
| 2015/0365833 A1 | 12/2015 | Stafford et al. |
| 2016/0019103 A1 | 1/2016 | Basra |
| 2016/0127185 A1 | 5/2016 | McAllister et al. |
| 2016/0127260 A1 | 5/2016 | Gordon |
| 2016/0127440 A1 | 5/2016 | Gordon |
| 2016/0135230 A1 | 5/2016 | Swierczynski et al. |
| 2016/0226922 A1 | 8/2016 | Russell et al. |
| 2016/0261425 A1* | 9/2016 | Horton .................. G05D 23/1917 |
| 2017/0164378 A1 | 6/2017 | Gunasekara et al. |

OTHER PUBLICATIONS

Miao, et al., "Distributed interference-aware energy-efficient power optimization," IEEE Transactions on Wireless Communications, Apr. 2011, vol. 10 (4), pp. 1323-1333.

Cisco Intelligent Network Architecture for Digital Video—SCTE Cable-Tec Expo 2004 information page, Orange County Convention Center, Jun. 2004, 24 pages.

Deering et al., Internet Protocol, Version 6 (Ipv6) Specification, IETF RFC 2460 (Dec. 1998).

Griffith, et al., Resource Planning and Bandwidth Allocation in Hybrid Fiber-Coax Residential Networks, National Institute of Standards and Technology (NIST), 10 pages, no. date.

Iab—"Digital Video In-Stream Ad Format Guidelines," 23 pages, released Jan. 8, 2016. 0.

Iab—RTB Project—"Open RTB API Specification Version 2.4" (Final Draft) dated Mar. 2016, 75 pages.

Iab—RTB Project—"Open RTB Dynamic Native Ads API Specification Version 1", 35 pages, dated Feb. 2015.

Iab—RTB Project—"Open RTB Dynamic Native Ads API Specification Version 1.1" dated Mar. 2016, 36 pages.

(56) References Cited

OTHER PUBLICATIONS

Iab—"Traffic Fraud: Best Practices for Reducing Risk to Exposure", 12 pages, dated Jan. 30, 2014.
Iab "Open Direct API Specification Version 1.0", 95 pages, finalized Jan. 2015.
Informal Standard, Document: id3v2.3, by: M. Nilsson, dated Feb. 3, 1999, 39 pages, http://id3.org/id3v2.3.0.
Internet Protocol DARPA Internet Program Protocol Specification, IETF RFC 791 (Sep. 1981).
Jicwebs "Traffic Fraud: Best Practices for Reducing Risk to Exposure", 14 pages, Version 1, Issued Jun. 2015.
Kanouff, Communications Technology: Next-Generation Bandwidth Management—The Evolution of the Anything-to-Anywhere Network, 8 pages, Apr. 1, 2004.
Motorola DOCSIS Cable Module DCM 2000 specifications, 4 pages, copyright 2001.
Open Cable Specification entitled "Enhanced TV Binary Interchange Format 1 0" OC-SP-ETV-131F1.0-106-110128 dated Jan. 28, 2011, 408 pages.
OpenVision Session Resource Manager—Open Standards-Based Solution Optimizes Network Resources by Dynamically Assigning Bandwidth in the Delivery of Digital Services article, 2 pages, (copyright 2006), (http://www.imake.com/hopenvision).
OpenVision Session Resource Manager features and information, 2 pages, no date, (http://www.imake.com/hopenvision).
SCTE 130-1 2013. Part 1: Digital Program Insertion—Advertising Systems Interfaces, Part 1—Advertising Systems Overview, 20 pages.
SCTE Standards Document ANSI/SCTE 118-2 2007 entitled "Program-Specific Ad Insertion—Content Provider to Traffic Communication Applications Data Model," 20 pages.
SCTE Standards Document ANSI/SCTE 130-2 2014 entitled "Digital Program Insertion—Advertising Systems Interfaces, Part 2—Core Data Elements," 78 pages.
Tandberg Television specification entitled "AdPoint.RTM. Advanced Advertising Platform" dated Mar. 2008, 2 pages.
UTF-32, IBM, retrieved from http://publib.boulder.ibm.com/infocenter/iseries/v5r3/index.jsp?topic=%2Fnls%2Frbagsutf32.htm on Aug. 28, 2013.

* cited by examiner

APPARATUS AND METHODS FOR ENABLING PRESENCE-BASED AND USE-BASED SERVICES

PRIORITY AND RELATED APPLICATIONS

This application is a divisional of and claims priority to co-owned U.S. patent application Ser. No. 14/500,835 of the same title filed Sep. 29, 2014, issuing as U.S. Pat. No. 10,028,025 on Jul. 17, 2018, which is incorporated herein by reference in its entirety.

The present application is related to co-owned, U.S. patent application Ser. No. 13/600,064 filed on Aug. 30, 2014 and entitled "APPARATUS AND METHODS FOR ENABLING LOCATION-BASED SERVICES WITHIN A PREMISES", which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The disclosure relates generally to the field of data and content distribution and delivery. In one exemplary aspect, the disclosure relates to enabling presence-based and/or use-based services.

2. Description of Related Technology

Content distribution networks (such as e.g., Cable Television (CATV), satellite, or hybrid fiber/copper (HFCu) systems) provide content from various content sources at a network headend to a plurality of users (e.g., subscriber) devices. In a typical "managed" network, a network operator (e.g., multiple systems operator or MSO) provides access to content via the network. Generally, the MSO provides audio/video content to subscribers from the network headend via the distribution network. Unmanaged networks such as the Internet may also distribute content to a plurality of users via user devices.

Recent advances in digital information processing and technology have made a wide range of additional services and functions available for delivery to consumers at various types of devices for very reasonable prices or subscription fees. These services and functions include delivery of digital content or programming (movies, etc.), digital video-on-demand (VOD) services, personal video recorder (PVR) and networked PVR (nPVR) services, Internet Protocol television (IPTV), digital media playback and recording, as well high speed Internet access (including so-called "Internet TV", where television programming is delivered over the Internet), IP-based telephony (e.g., VoIP), and access to client applications via mobile devices. Other services available to network users include without limitation access to, and recording of, digital music (e.g., MP3 files), and submission of "organic" media (e.g., home-grown YouTube™ videos, etc.).

Currently, many of these services are provided to users via a wide variety of different equipment environments and delivery paradigms including, inter alia, cable or satellite modems or QAMs, HFCu (i.e., Hybrid Fiber-copper distribution via indigenous POST/PSTN and/or coaxial wiring in a premises), cellular networks such as LTE/LTE-A and 3G, optical fiber such as FTTC, FTTH, etc., Wi-Fi™ hubs, Ethernet hubs, gateways, switches, and routers, and to a plurality of user equipment types (e.g., set-top boxes, personal (desktop) computers, laptop computers, other mini-computers such as so-called "netbooks" and mini-notebook computers, and/or other devices). Recent advances in consumer electronics have also led to the widespread introduction of a variety of portable media devices (PMDs) such as, inter alia, portable digital music devices such as so-called "MP3 players", cellular telephones/smartphones, handheld computers, tablets such as the Kindle™ and Nook™, and personal digital assistants (PDA), which allow users to store and playback audio and video files.

Various device applications provide or incorporate services which vary based on a location of a portable media device (or user thereof) within a given premises. For example, certain applications may have modified volume, brightness, etc. settings based on what room a person is in. Additionally, power-saving systems rely on a location of a person within the home. For example, if it can be determined that no one is in e.g., the family room, power to a rendering or other device in that room may be cut. These systems, however, require a user to manually enter a location via a user interface or otherwise require advanced detection technologies (e.g., infrared or motion detectors) to be installed within a premises.

Moreover, well known systems are used to target particular subscriber demographics. However, such systems are unable to track a particular user across multiple platforms and locations in order to derive a more unique and specific user profile and/or use a more unique and specific user profile for making content insertion decisions.

Hence, methods and apparatus are needed which inter alia, enable presence-based and/or use-based services to function independent of manual entry of information relating to location and/or use, and using services and functions of devices currently existing within a network. Such methods and apparatus would in one implementation ideally be provided across multiple client devices within a premises such as a household or business.

SUMMARY

The present disclosure provides, inter alia, apparatus and methods for enabling presence-based and/or use-based services.

In a first aspect of the invention, a method of enabling presence-based services to a plurality of client devices in a content based network is disclosed. In one embodiment, the method includes: associating each of the plurality of client devices to a specific user profile within a particular subscriber household; receiving raw data relating to a location of at least one of the plurality of client devices; evaluating the raw data to determine a precise location of the at least one of the plurality of client devices; and storing the raw data and/or a result of the evaluation.

In a second aspect of the invention, a method of enabling use-based services to a plurality of client devices in a content based network is disclosed. In one embodiment, the method includes: enabling a plurality of content providers in a non-managed network to register content in a managed network; collecting a plurality of data relating to an interaction of the plurality of client devices with the registered content; and associating individual ones of the plurality of collected data to respective particular ones of a plurality of users in the content based network.

In another aspect of the invention, a presence evaluation apparatus is disclosed. In one embodiment, the apparatus comprises: at least one interface configured to communicate with a content based network; at least one interface configured to communicate within a premises network; a processor configured to run at least one computer program thereon, and a storage apparatus in data communication with the processor and the at least one interface and having the at least one computer program stored thereon. In one variant, the at least one program comprises a plurality of instructions which are configured to, when executed by the processor: (i) generate a device profile for each of a plurality of devices associated to the consumer premises, (ii) collect and evaluate information relating to a location of a particular device, and (iii) associate the collected data with individual ones of the plurality of devices. In another variant, the at least one program comprises a plurality of instructions which are configured to, when executed by the processor: (i) evaluate a plurality of information to determine one or more patterns therein, (ii) utilize the patterns to determine one or more preferred device settings and/or provide predicted or targeted content to one or more devices.

In another aspect of the invention, a mobile user wireless device configured for location-specific operation is disclosed. In one embodiment, the device includes: a processor; a wireless transceiver in data communication with the processor; and a storage device in data communication with the processor and having a computer program disposed thereon. In one variant, the program is configured to, when executed: provide a plurality of information to a presence evaluation entity.

In another aspect of the invention, a system configured for enabling presence-specific and/or use-specific services at one or more client or user devices is disclosed.

In another aspect of the invention, a computer readable apparatus having at least one program disposed thereon is disclosed. In one embodiment, the at least one program is configured for enabling presence-specific and/or use-specific services at one or more client or user devices.

In a fifth aspect of the invention, a mobile user wireless device configured for location-specific operation is disclosed. In one embodiment, the device includes: a processor; a wireless transceiver in data communication with the processor; and a storage device in data communication with the processor and having a computer program disposed thereon. In one variant, the program is configured to, when executed: provide a plurality of information to a presence evaluation entity.

In a sixth aspect of the invention, a system configured for enabling presence-specific and/or use-specific services at one or more client or user devices is disclosed.

In a seventh aspect of the invention, a computer readable apparatus having at least one program disposed thereon is disclosed. In one embodiment, the at least one program is configured for enabling presence-specific and/or use-specific services at one or more client or user devices.

These and other aspects of the disclosure shall become apparent when considered in light of the disclosure provided herein.

Figure 1:
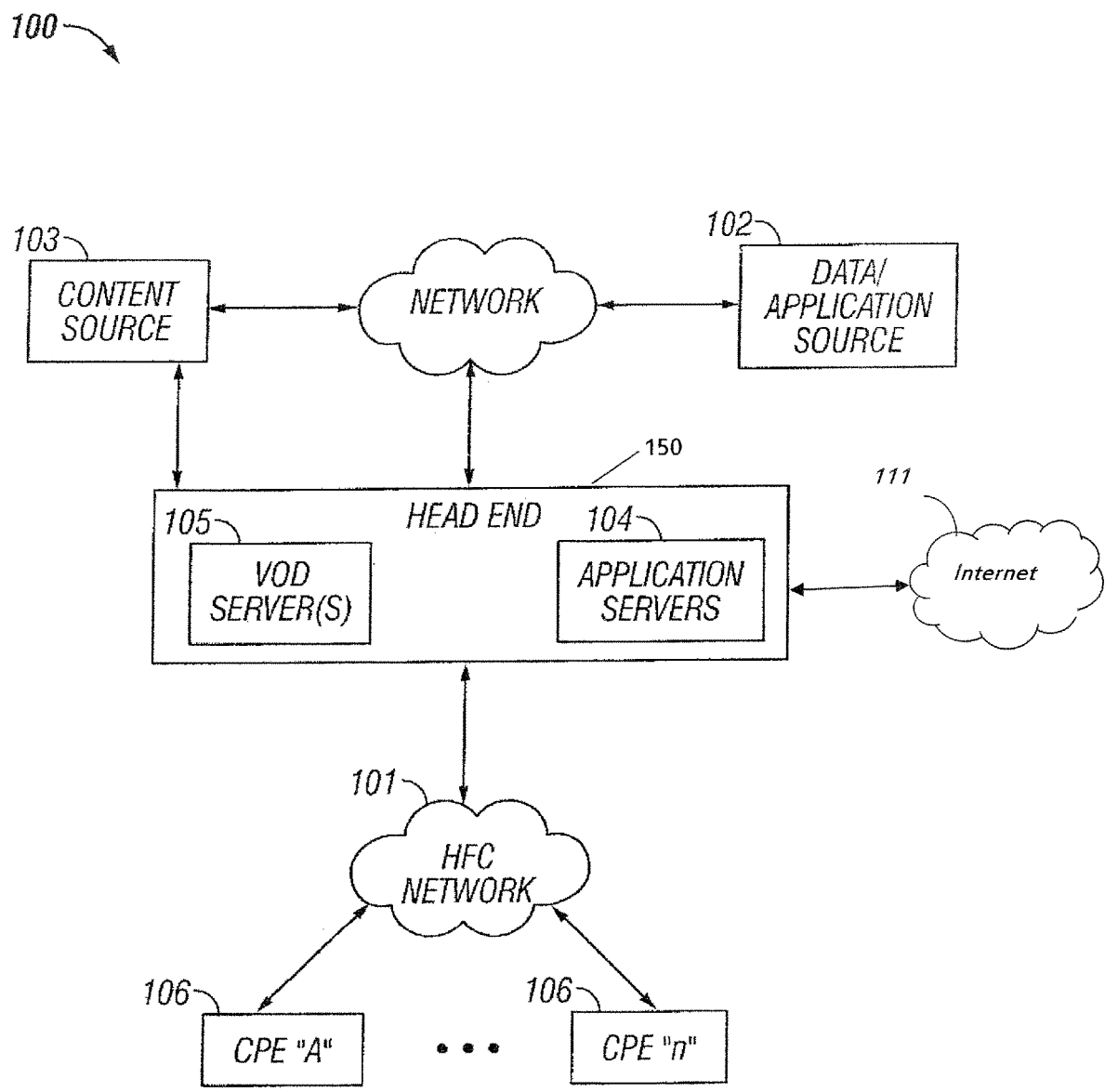
FIG. 1 is a functional block diagram illustrating an exemplary HFC cable network configuration useful with the present disclosure.

All Figures © Copyright 2014 Time Warner Cable Enterprises LLC. All rights reserved.

DETAILED DESCRIPTION

Reference is now made to the drawings wherein like numerals refer to like parts throughout.

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, and smartphones.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

The term "consumer premises equipment (CPE)" refers without limitation to any type of electronic equipment located within a consumer's or user's premises and connected to a network. The term "host device" includes terminal devices that have access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (Furnace), and ITV Personal Computers.

As used herein, the term "DOCSIS" refers to any of the existing or planned variants of the Data Over Cable Services Interface Specification, including for example DOCSIS versions 1.0, 1.1, 2.0 and 3.0.

As used herein, the term "gateway" includes, without limitation, devices configured to interface with a network, and pass signals to or exchange signals with, another device in communication therewith. Various exemplary gateways are described in, inter alia, co-owned U.S. Pat. No. 7,954,131 issued on May 31, 2011 entitled "PREMISES GATEWAY APPARATUS AND METHODS FOR USE IN A CONTENT-BASED NETWORK", U.S. patent application Ser. No. 12/582,619 filed on Oct. 20, 2009, entitled "GATEWAY APPARATUS AND METHODS FOR DIGITAL CONTENT DELIVERY IN A NETWORK", and issued as U.S. Pat. No. 9,027,062 on May 5, 2015, and U.S. patent application Ser. No. 12/480,597 filed on Jun. 8, 2009, entitled "MEDIA BRIDGE APPARATUS AND METHODS", and issued as U.S. Pat. No. 9,602,864 on Mar. 21, 2017, each of the foregoing being incorporated herein by reference in its entirety.

As used herein, the term "headend" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer without limitation to a cable, fiber to the home (FTTH), fiber to the curb (FTTC), satellite, Hybrid Fiber Copper (HFCu), or terrestrial network provider having infrastructure required to deliver services including programming and data over those mediums.

As used herein, the terms "network", "managed network", and "bearer network" refer generally to any type of telecommunications or data network including, without limitation, hybrid fiber coax (HFC) networks, HFCu networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols.

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.) or IrDA families.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer system or network.

As used herein, the term "service", "content", "program" and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "Wi-Fi" refers to, without limitation, any of the variants of IEEE-Std. 802.11 or related standards including 802.11 a/b/g/n/s/v/ac or 802.11-2012.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, and infrared (i.e., IrDA).

Overview

In one salient aspect, the present disclosure provides methods and apparatus for enabling presence-based and/or use-based services. In one exemplary embodiment, a presence database and an evaluation entity collect information relating to a device's location and use or activity. The presence database is created to collect location-based data points to build anonymized user profiles to, for example, better target messages across a network such as an unwired delivery network. The information is utilized to estimate a physical location (such as a particular store, premises, etc.) of the device. The device location can then be used for providing targeted content thereto, and/or can be added to a profile relating to the activity of the user.

The user profiles are in one variant stored at e.g., the presence data base and/or evaluation entity which may be located at a user premises, or at a headend network/cloud.

Additionally, signals are collected from utility and entertainment appliances (in a home or other premises) to create personal, shared, and family environmental settings which are instantiated when a user enters the premises. Data is collected through mobile device opt-in mode and propensity scored to customize utility and entertainment environments. The collected data may be further utilized to identify targeted content across a delivery network.

Method and apparatus to collect browsing behavior across desktop and mobile devices on third party sites (including web browsing, social networking, and e-commerce) which are represented by the managed network are also provided. In one embodiment, data is fused with other collected information in the aforementioned profiles to aid in powering advertisement insertion and/or content engines including but not limited to Online Interconnect, QAM Video, IPTV, Mobile, Web Exchanges, Social, and Demand-Side Platforms.

Detailed Description of Exemplary Embodiments

Exemplary embodiments of the apparatus and methods of the present disclosure are now described in detail. While these exemplary embodiments are described in the context of the aforementioned hybrid fiber/coax (HFC) cable system architecture having a multiple systems operator (MSO), digital networking capability, IP delivery capability, and plurality of client devices/CPE, the general principles and advantages of the disclosure may be extended to other types of networks and architectures, whether broadband, narrowband, wired or wireless, managed or unmanaged, or otherwise, the following therefore being merely exemplary in nature. For example, the disclosure may be practiced over a fiber-to-the-home (FTTH) or fiber-to-the-curb (FTTC) system, HFCu networks, or over satellite or millimeter wave-based networks.

It will also be appreciated that while described generally in the context of a consumer (i.e., residential) end user domain, the present disclosure may be readily adapted to other types of environments (e.g., commercial/enterprise, government/military, etc.) as well. Myriad other applications are possible.

Other features and advantages of the present disclosure will immediately be recognized by persons of ordinary skill in the art with reference to the attached drawings and detailed description of exemplary embodiments as given below.

Network—

FIG. 1 illustrates a typical content delivery network configuration with which the apparatus and methods of the present disclosure may be used. The various components of the network 100 include (i) one or more data and application origination points 102; (ii) one or more content sources 103; (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the disclosure.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

A separate content server (not shown) may also be provided for delivery of broadcast and other non-VOD content.

The CPE 106 includes any equipment in the "customers' premises" (or other locations, whether local or remote to the distribution server 104) that can be accessed by a distribution server 104.

Figure 1A:
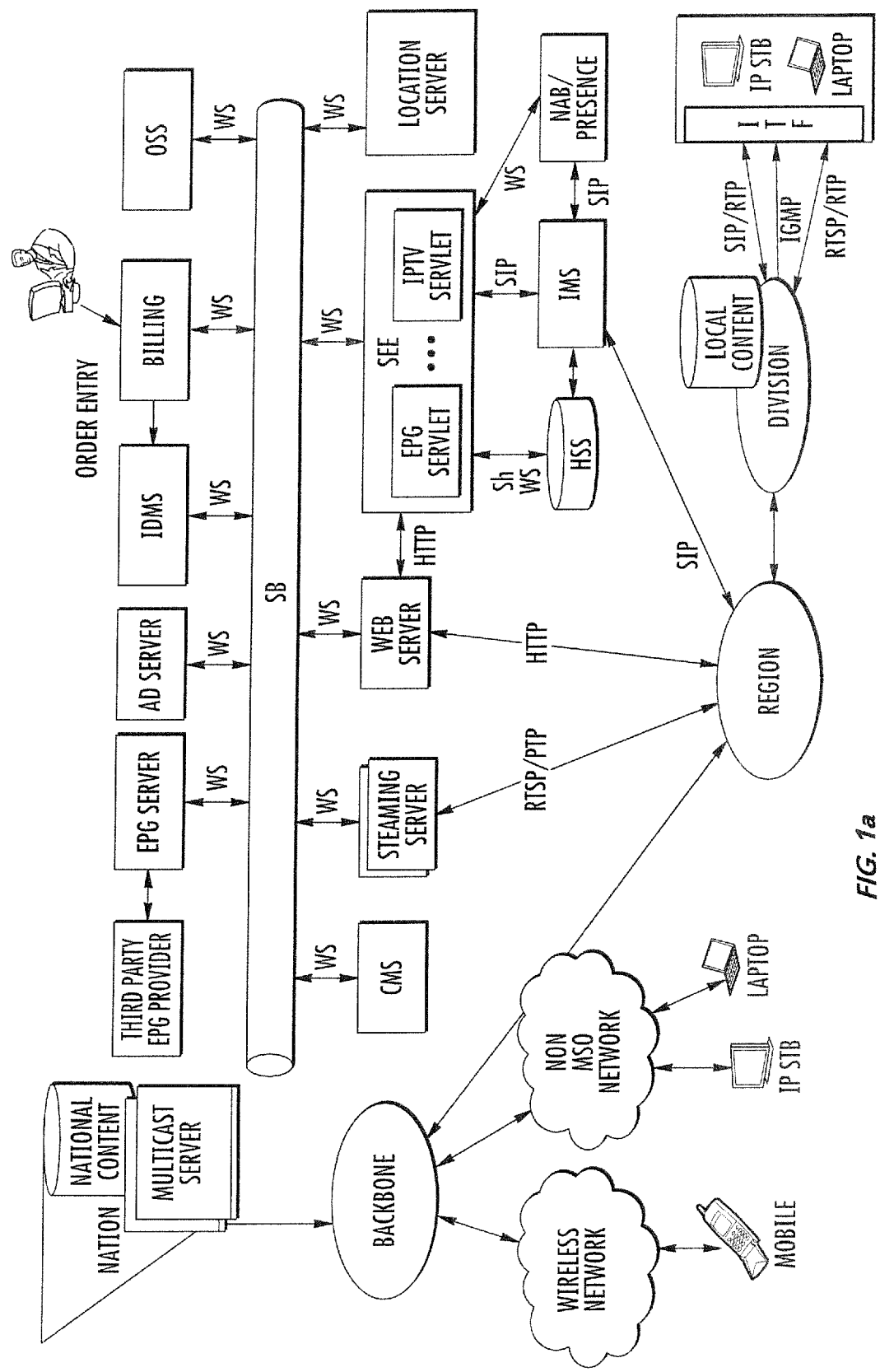
FIG. 1a is a functional block diagram illustrating one exemplary packetized content delivery network architecture useful with the present disclosure.

In addition to "broadcast" content (e.g., video programming), the network 100 of FIG. 1 (and FIG. 1a, described below) also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over one or more Data Over Cable Service Interface Specification (DOCSIS) channels comprising MPEG (or other video codec such as H.264, H.265, or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem.

While the foregoing network is discussed as carrying packetized content (e.g., IP over MPEG for high-speed data or Internet TV, MPEG2 packet content over QAM for MPTS, etc.), the network is often not optimized for such delivery. Hence, in accordance with another embodiment of the present disclosure, a "packet optimized" delivery network is used for carriage of the packetized content (e.g., IPTV content). FIG. 1b illustrates one exemplary implementation of such a network, in the context of a 3GPP IMS (IP Multimedia Subsystem) network with common control plane and service delivery platform (SDP), as described in co-owned and co-pending U.S. patent application Ser. No. 12/764,746 filed on Apr. 21, 2010, entitled "METHODS AND APPARATUS FOR PACKETIZED CONTENT DELIVERY OVER A CONTENT DELIVERY NETWORK, published as U.S. Patent Application Publication No. 2011/0103374 on May 5, 2011, and which is incorporated herein by reference in its entirety. Such a network provides significant enhancements in terms of, inter alia, common control of different services, implementation and management of content delivery sessions according to unicast or multicast models, etc.; however, it is appreciated that the various features of the present disclosure are in no way limited to any of the foregoing architectures.

Exemplary Network Architecture—

Figure 2A:
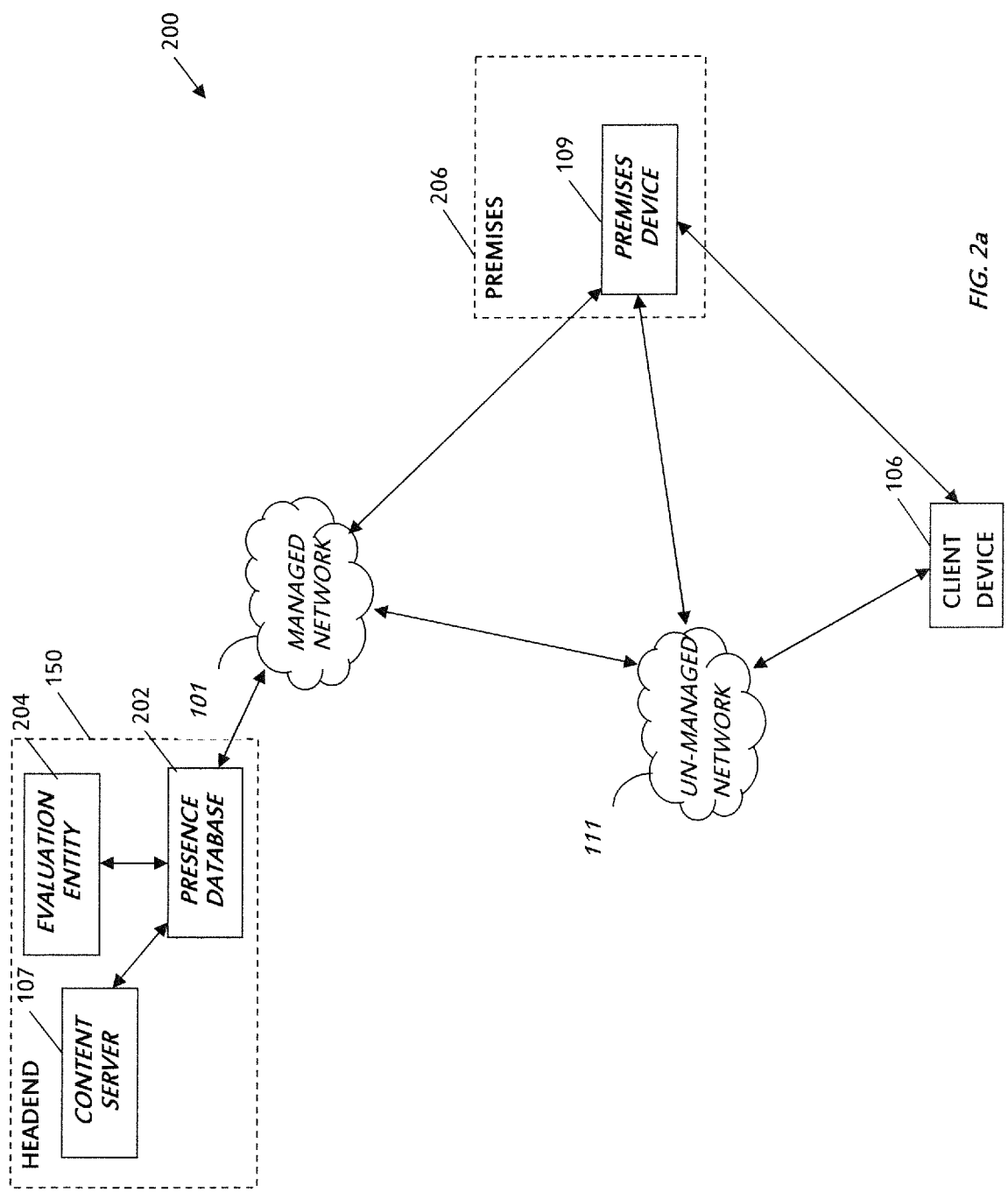
FIG. 2a is a functional block diagram illustrating one exemplary embodiment of a network architecture for enabling presence-based and/or use-based services.

Referring now to FIG. 2a, an exemplary embodiment of a network architecture 200 for providing presence-based and/or use-based services according to the present disclosure is illustrated. It will be appreciated that the architecture 200 of FIG. 2a can be used in conjunction with any of the foregoing network content distribution architectures (i.e., those of FIGS. 1-1a discussed supra), or can form the basis of its own distribution and delivery architecture.

As illustrated, the network 200 generally comprises a client device 106 in communication with a premises network 206 and an unmanaged network 111 (such as e.g., the Internet). As shown, the premises network 206 is further in communication with a managed network 101 (such as that discussed above with respect to FIGS. 1-1a). The managed 101 and unmanaged networks 111 are in communication with one another in the illustrated embodiment.

As noted above, the managed network 101 may comprise a headend 150 from which content is delivered from a content server 107 thereat, to the premises network 206. The premises network 206 is further in communication with a plurality of client devices (not shown) to which the content is ultimately distributed. In the illustrated embodiment, for example, this may occur via the premises device 109 which acts as a gateway of sorts for other client devices 106 in communication therewith. Although only a single client device 106 is illustrated, it is appreciated that any number of devices 106 may be in communication with a particular premises device 109 and/or unmanaged network 111.

A headend 150 located presence database 202 and evaluation entity 204 cooperate to provide presence-based and/or use-based services to the mobile client devices 106 and/or the fixed premises device 109. It is further appreciated that the evaluation entity 204 and the presence database 202 may comprise a single entity and/or may exist across one or more distributed applications (i.e., where a portion of the described functionality exists at the headend 150 and a remaining portion is distributed to a remote entity, such as an entity of the non-managed network or the premises 206).

Specifically, in one embodiment, the presence database 202 is configured to generate a plurality of user profiles, each profile uniquely associated with a particular subscriber. As discussed in greater detail below, the profiles comprise a plurality of information relating to presence and/or use by the subscriber. In one specific example, the presence database 202 enables each user to register his/her device to the network. This may occur such as via an opt in/out mechanism, or may be related to the establishment of a subscriber account with the managed network 101.

Once a user profile is established for a particular subscriber, the presence database 202 collects information relating to the geographic locations at which the particular subscriber's device is located, as well as data relating to the activities and status of the device (i.e., activity records). The collected data/records are stored at the presence database 202 for utilization by the evaluation entity 204. It is further noted that the presence database 202 is configured to when new data or records are received, utilize information contained in the data and/or contained in metadata to identify the particular device and/or subscriber to which the records are associated and further update the appropriate profile.

The evaluation entity 204 communicates with the presence database 202 to provide and/or enable specific presence-based and/or use-based services to the client devices 106. As will be discussed in greater detail below, the evaluation entity 204 is configured to analyze or evaluate the data collected at the presence database 202. For example, the evaluation entity 204 may utilize the collected data to identify patterns therein. The identified patterns may be further used to group one or more profiles, such as by household, demographic, geographic area, common interests, etc. In addition, the patterns may be used for targeted content insertion and/or fraud detection (as discussed in greater detail below). Identified patterns may also be used, as described herein, to determine so-called "important" locations to the subscriber. Locations which are deemed as important may be further utilized for demographic or common interest groupings as well as for targeted content insertion. Still further, the data collected and maintained at the presence database 202 may be utilized by the evaluation entity 204 to determine a subscriber's preferred settings, then implement these settings upon a particular event (either events determined by the user or by the network).

The herein described data collection and record retention may, in one exemplary embodiment occur while advantageously maintaining subscriber anonymity. For example, the apparatus and methods disclosed in co-owned, co-pending U.S. patent application Ser. No. 14/304,709 filed on Jun. 13, 2014 and entitled "METHODS AND APPARATUS FOR AUDIENCE DATA COLLECTION AND ANALYSIS IN A CONTENT DELIVERY NETWORK", which is incorporated herein by reference in its entirety, may be utilized to ensure collected data records preserve subscriber privacy. For example, collected data records may be associated to a particular device using e.g., a MAC address, IP address, or other unique identifier associated to the device. Prior to transmission of the data records, the device 106 itself, or other intermediary device such as e.g., the gateway 109, anonymizes the portion of the data which identifies the specific device 106 from which the data was obtained. In one embodiment, the data is anonymized by inter alia, the use of a cryptographic hash coupled with an optional "opaque" variable which carries information relating to the CPE of the hash with which it is associated. The hash and opaque variable frustrate de-encryption or reverse-engineering of the individual subscriber's identity or specific location. Alternative methods of providing anonymization may also be utilized consistent with the present disclosure.

In another embodiment, data may be collected utilizing the methods and apparatus of co-owned U.S. patent application Ser. No. 13/936,055 filed on Jul. 5, 2013, entitled "APPARATUS AND METHODS FOR DATA COLLECTION, ANALYSIS AND VALIDATION INCLUDING ERROR CORRECTION IN A CONTENT DELIVERY NETWORK", and issued as U.S. Pat. No. 9,003,436 on Apr. 7, 2015, which is incorporated herein by reference in its entirety. As discussed therein, data relating to user interaction with content is collected, validated, analyzed and error correction is automatically performed. For example, audience information may be obtained directly from customer's premises equipment (i.e., set top boxes, cable modems, PCs, PMDs, IP devices, etc.), for each individual device, or even on a per-user basis where possible, thereby allowing a content provider or other analytical entity to gather specific information in large quantities across a broad geographical area, or demographic/psychographic slice. Advantageously, multiple sources of content to which viewership behavior relates can be simultaneously monitored, and subscriber anonymity or privacy maintained (i.e., no use is made of personally identifiable information). The aforementioned systems and methods also may optionally be configured to "predict" tuning behavior for groups as well as individual users.

In one embodiment, statistical methods (e.g., linear regression, log linear regression) are used to arrive at an expected value for one or more of the various fields and records of the collected data. Collected data is compared to the derived (e.g., average, median) or expected value, and if the data meets one or more prescribed criteria (e.g., is a given number of standard deviations away from the expected value or more) indicating that the data quality may be unacceptable, an error message is generated and the data optionally excluded. The criteria used to judge the data (e.g., number of standard deviations which the data is permitted to vary from the expected value) may be determined by the network operator, or an algorithm/computer program. Hence, the present disclosure advantageously enables monitoring of an entire system proactively using a statistical or other method to alert the network operator only in the instance erroneous data meeting the test(s) of significance is received. The present disclosure improves over prior methods by, among other things, enabling a network operator to assess a large volume of data (in a comparatively contracted period of time) without requiring manual monitoring and/or error correction.

In addition, data may be collected, validated and analyzed across multiple platforms. That is, data regarding a user's interaction with content may be collected and utilized regardless of the device on which the content is received or requested, the source of the content, the type of content (e.g., linear, VOD, DVR, high-speed data, etc.), etc. While the exemplary systems and methods operate utilizing two-way capable user devices such as those used in cable or fiber optic (FTTC, FTTH, etc.) networks, non-two way capable devices (such as for example are used in some satellite-based implementations) can leverage various backhauls (e.g., broadband, DSL/dial-up or "over the top" backhaul) from the target premises to transmit tuning or other useful information to a third party (e.g., third party web site). A third party, the presence database 202, and/or the evaluation entity 204 collects the data and sends the data back to the satellite MSO (or caches the data first, and sends it up to the MSO at a later time). Pre-processing or "enrichment" of the data may also be conducted if desired.

The apparatus and methods of the present disclosure may be used to collect, validate and analyze a heretofore unprecedented volume of data. Evaluation criteria are set such that the network operator is not flooded with alerts of erroneous data. Instead, a multi-tier approach is utilized to allow for e.g., some processing, no processing, minimal processing, total evaluation, etc. This is accomplished by enabling the administrator to define the statistical parameters (e.g., of the regression); the administrator may "tune" these parameters over time based on experience in the field and other inputs.

The presence database 202 receives the anonymized data and utilizes information stored at the database 202 to unmask the identity of the device, then associates the device to a previously generated profile. The unmasked identity in one embodiment is only used in this context (e.g. from the operators perspective, it remains opaque unless subscriber has opted-in). If no profile exists, a new profile may be created. Alternatively, the herein described functionality may occur in whole or in part at the subscriber's premises, thereby obviating a need for all or any device specific data to be transmitted across the network.

Figure 2B:
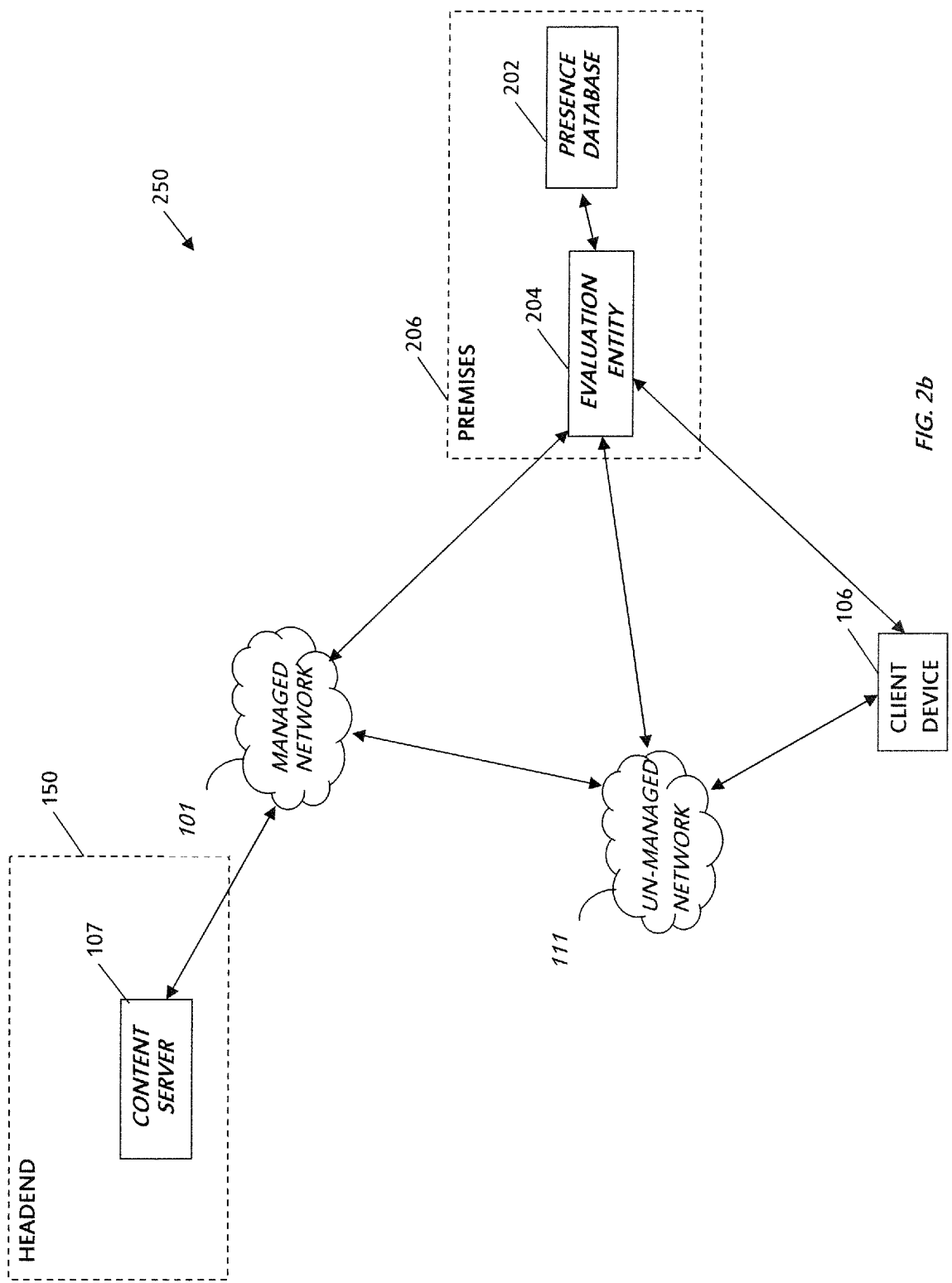
FIG. 2b is a functional block diagram illustrating another exemplary embodiment of a network architecture for enabling presence-based and/or use-based services.

FIG. 2b illustrates one alternative network 250 embodiment. In the illustrated variant, the presence database 202 and evaluation entity 204 are located at the subscriber's premises. According to this variant, information relating to the particular subscriber is not transmitted to the network 101, but rather is collected and utilized securely in the premises. The collected device-specific data relating to presence and/or use may be anonymized for secure storage within the premises as well.

The specific presence-based and/or use-based services which are provided via the presence database 202 and evaluation entity 204 of FIGS. 2a-2b are described in further detail below with respect to FIGS. 3-6.

Exemplary Presence-Based Services Methods—

Figure 3:
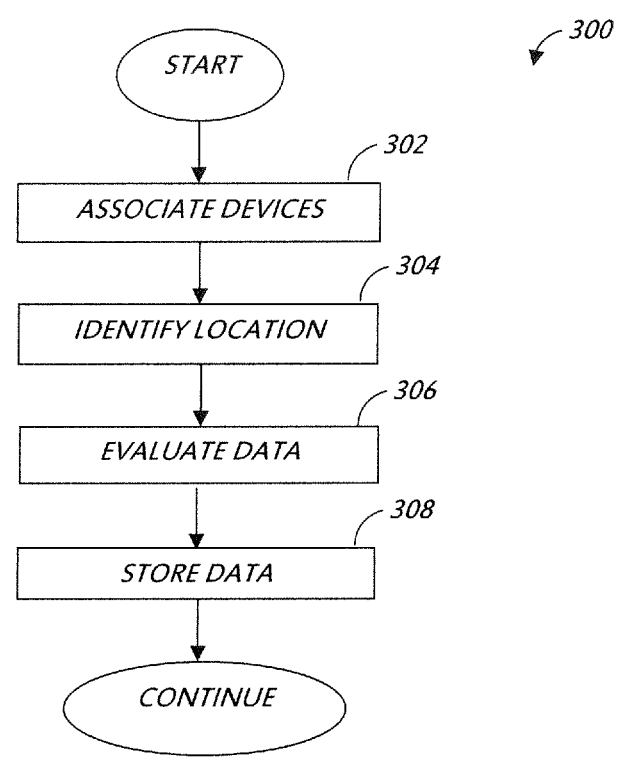
FIG. 3 is a logical flow diagram illustrating an exemplary embodiment of a method for enabling presence-based services.

FIG. 3 is a logical flow diagram illustrating an exemplary embodiment of a method 300 for enabling presence-based services. The illustrated method 300 creates an explicit presence database that collects location-based data points to build anonymized user profiles to better target messages across an unwired delivery network.

As shown, the method generally comprises at step 302 an association of a plurality of devices 106. In one embodiment, each subscriber device 106 is associated to a household. For example, a Wi-Fi and/or LAN connection within household may be used to make an initial association such as when a device 106 is used for e.g., browsing, email, etc. via the household cable modem. A unique identifier of the device 106 (e.g. MAC Address, etc.) is stored and utilized for association purposes. Additionally, each device 106 may be associated to a specific user profile. The user profiles are generated based on data obtained from the one or more devices 106 associated to that profile.

In one variant, established usage patterns (whether purchased or learned through panel watching) are used to infer an identity to which a device 106 is associated. For example, when the device 106 is primarily located at a school on weekdays between 8 am and 4 pm, and the usage patterns indicate a relatively high number of tweets, status updates to social networking sites, and/or text patterns, it may be inferred that the device 106 is associated to a teenager's profile.

In one embodiment, the derivation of patterns from received data may occur at e.g., the presence database 202 while generating the user profiles, or the evaluation entity 204 during evaluation of the collected records (as discussed elsewhere herein). One or more of these entities may include a pre-populated list of "rules" which link categories of activities to a numerical value indicative of a tendency of a user to fall within a particular demographic if that category of activity is detected. For example, the list may indicate an 80% likelihood that when data records indicate that a user (i.e., the user device 106) is at a school within a given time frame (e.g., weekdays between 8 am and 4 pm), that person is a school-age child. Further, the age range may be narrowed based on the identity of the school itself (e.g., high school, junior high school, etc.) as determined by geographic coordinates (discussed herein). Additionally, the list may indicate a certain number or frequency of status updates to social network sites and/or picture or short video uploads thereto, directly correlates to an age group. Hence, when data is received it may be compared against the foregoing "rules" to predict a demographic to which the device 106 belongs. Next, the predicted demographic is compared to information about the subscriber household to determine a particular profile to which the device 106 and collected data relate (e.g., mom, dad, teenage daughter, etc.)

In yet another embodiment, the devices 106 may be manually registered to a particular profile by the user thereof. In this embodiment, a user interface may be provided via any one of the client's devices 106 which enables the user to enter a device name or other identifier for each device 106 and place each device 106 within a particular user profile.

In this manner, each subscriber household may be comprised of a plurality of devices 106 and a plurality of user profiles (such as one for each family member).

Next, at step 304, a location of the device 106 is identified. The device location may be determined using e.g., global positioning system (GPS) or other device-inherent mechanisms for capturing latitude/longitude/elevation data.

Additionally, within a multi-location premises, a specific room, apartment, store, etc., location or presence may be determined using e.g., spatial evaluation techniques, such as by utilizing beamforming technology as set forth in IEEE standard 802.11ac™ entitled "Very High Throughput 5 GHz". Beamforming is a signal processing technology that is used to direct the reception or transmission (the signal energy) on a transducer array in a chosen angular direction (i.e., directional signal transmission or reception). Beamforming concentrates the array to signals coming from only one particular direction to listen to signals in one direction and ignore signals in other directions, such as by combining elements in the array in such a way that signals at particular angles experience constructive interference while others experience destructive interference, akin to the well-known "phased array". Devices leveraging beamforming technology are therefore able to focus wireless signals directly to a particular device 106, as opposed to wireless hotspots, which "radiate" wireless signals indiscriminately. In other words, beamforming technologies enable a wireless access point (as may be found in the gateway 107) to recognize devices 106 that need wireless access and focus the wireless signals directly to the device or devices 106 which need them. By utilizing beamforming technologies, a device located at the multi-room or multi-location premises (such as e.g., the gateway 109) is able to beam signals around corners and through walls.

In another embodiment, the exemplary gateway device 109 takes advantage of the multiple transmit antennas available in a multiple-input multiple-output (MIMO) system. Signals are sent between multiple antennas of the gateway device 109 and client devices 106; the signals are coordinated to combine constructively at the device receiving the signal (either the gateway device 109 or client devices 106). Specifically, using beamforming technology, for each client device 106, the phases of the transmit signals are manipulated to improve directivity thereto. Efficient steering of individual streams in such a system provides overall signal gain. This can be achieved through knowledge of the channel between the transmitter and receiver. Information may be extracted during this process to identify a location of the device 106 within the premises. For example, various data relating to the signal quality and amplification needed to transmit signals to and/or receive signals from individual ones of the devices 106 is collected. The data may include e.g., Wi-Fi channel state, RF power, delay, signal phase, signal quality, amplification, etc. The data is then used to estimate a location of a device 106 (such as based on comparison to previously gathered data and/or standard or reference data).

In another embodiment, in addition to or as an alternative to the beamforming technologies, presence or location-based services are provided by leveraging infrared (IR) ports or other short-range wireless technology on a set-top box (STB). According to this embodiment, IR signals are broadcast from the client devices 106 to the STB; the STB or gateway 109 then correlates the signals to a location within the premises (i.e., the known location of the STB). In other words, the location of the STB is known by the gateway device 109. Thus, when a signal is broadcast from the client device 106 to the STB and is re-broadcast to the gateway 109, the gateway 109 is able to associate the device 106 to the known location of the STB which re-broadcast the signal.

Additional mechanisms for determining a device location may be utilized consistent with the present disclosure, such as those described in co-owned U.S. patent application Ser. No. 13/600,064 filed on Aug. 30, 2012, entitled "APPARATUS AND METHODS FOR ENABLING LOCATION-BASED SERVICES WITHIN A PREMISES", and issued as U.S. Pat. No. 8,862,155 on Oct. 14, 2014, which is incorporated herein by reference in its entirety.

The location query may comprise for instance a data push or pull mechanism, and may be performed periodically as determined by the network or user. In another embodiment, triggering events (such as a change in location) may be utilized to stimulate location data generation and delivery.

The latitude/longitude/elevation information is provided to the presence database 202 for evaluation at step 306. The evaluation step 306 may include determining a profile and/or household to which the collected data is associated based on a unique device identifier within the data or metadata.

The collected data is further evaluated to determine a location associated to the device 106 at the time it was collected. For each location, the latitude/longitude/elevation are cross-referenced to publically available data to determine the specific place of business, residence, etc. visited. In a further embodiment, the latitude/longitude data is adjusted to include a radius of predetermined amount for determining location specifics. In this embodiment, when a user patronizes but does not enter a store, such as occurs at drive-thru or convenience stores, the data will reflect the visit. Elevation data is further used to identify within a multi-level premises (such as a shopping mall, or apartment complex) a particular location.

In another variant, the user of the device 106 may be provided with an identified location as derived from the raw latitude/longitude/elevation data (such as via a user interface). The user may be given an opportunity to affirm a correctly identified location and/or manually select a correct location from a list of nearby possibilities (e.g., other locations within a given radius of the provided latitude/longitude/elevation data) in the instance the identified location is incorrect. Additionally, the system may be configured to "learn" locations. In one implementation, at the time a user manually enters a location, or a location is otherwise determined, the presence database 202 and/or evaluation entity 204 may be configured to use the previously received information to automatically identify the location in future instances when the device 106 is at or near that same location. In other words, they system may omit the evaluation step (step 306) in the event the device 106 is at a location (as determined by the latitude/longitude/elevation data) which the device 106 has previously been located.

The foregoing concept can be extended to enable the application to speculate on the user's next location as well. For example, one variant of the application includes a moving "learning mode", wherein the gateway 109, presence database 202, and/or evaluation entity 204 takes frequent location measurements while the user moves from one location to the next over time (such as through the course of a typical weekday for example), and saves these data as "maps" indicating the user's path of traversal. By knowing the user's typical route, the system can then speculate that where the user is going to be at a given time on a given day.

The evaluation step (step 306) may further include utilizing a timestamp associated to each data record to determine how long a user is present at a given location. Such information is useful in determining whether a particular location is "important" to the subscriber. In one exemplary embodiment, the length of contiguous time spent at a specific location (or within a given radius of the specific location) is determined. Importance of a location may be based on the amount of time. Alternatively, patterns may be identified within the data so as to determine whether a time spent at the location coincides with an amount of time that a typical user would spend at that location. For example, if a device 106 is noted to be at a gym or library for less than an hour, it is not likely that the user participated in the activities associated with these locations, as they typically take an hour or more. A frequency of visits may also be used to identify an importance of a location.

In addition, the latitude/longitude/elevation data may be evaluated to determine whether the user has simply passed through a location or is browsing (e.g., a smooth curve versus a closed loop within the allotted radius).

For each location that is determined to be important (e.g., based on number, duration and frequency of visits), the type of location is determined. For example, if it is a quick service facility, what kind or type; if it is a restaurant, what type; if it is a park, which one; if it is a gym, which one or type, etc. This is determined by reviewing the latitude/longitude/elevation information against known physical addresses/locations as discussed above.

The locations which are deemed to be important may be mined over time to identify trends with meaningful audience sizes (as determined by a secondary content source operator or network operator). For example, it may be determined how many subscribers within a certain ZIP code (as determined from billing information) visit mid-tier restaurants one or more times within a week, or how many go to a gym and whether what percentage of those same subscribers also visit particular grocery stores in the same area, etc.

In another variant, patterns are identified among users extending beyond a particular household to include an entire city, a specific sub-portion of a city (e.g., ZIP code), or any other sub-set of all subscribers to a managed network 101, and additional valuable information may be derived. For example, a presence profile of "health enthusiast" may be applied to users who visit gyms 3 or more times a week and other health related stores at least twice a month; a presence profile of "runner" to users who begin at their homes or at a park and travel between 5-7 miles per hour for a half-hour or more and in a closed loop. Other profiles may be determined based on location, patterns, time of day, day of the week, duration of visit, types of locations frequented, etc.

Furthermore, for each presence profile, the evaluation entity 204 or other headend entity may identify the types of networks utilized by the users in that profile (e.g., broadcast over QAM, IPTV, QAM VOD, etc.) and build an advertising campaign or story around those audiences. Moreover, individual advertising spots may be purchased by advertisers who aim to reach people within the identified presence profile.

In another embodiment, the presence profiles are assigned a score and used to identify presence cohorts for e.g., power demand slide platform (DSP) purchases of the audience, power content engines to deliver more relevant content to the end user, predict viewing patterns, provide social network and/or mobile network presence, and/or enrich subscriber data. In one variant, the subscriber data comprises so-called "Subscriber Information Application" data or any other implementation of Society of Cable Television Engineers (SCTE) 130-6 Subscriber Information Services data.

Finally, at step 308, the data is stored. The stored data may be held at the premises or at a network entity in communication therewith. In the instance the data is stored at a location outside the premises, the aforementioned anonymization techniques may be utilized to protect the subscriber identity.

In another embodiment, the forgoing may be accomplished via a registration process. In one variant, the registration process comprises, when a household is assigned to a presence database 202, associating the household to a unique identifier that is also associated to a particular subscriber account. For example, during the installation process, a registration page may be presented in which the subscriber enters an account number and other authenticating information by which the device is added to the household, and a unique identifier is assigned. Newly discovered devices in the household are also added. For example, an active search for devices in the household's Wi-Fi network may be conducted (e.g., refrigerator, lighting control, HVAC control, security control, etc.). Alternatively, the devices may be registered manually to the presence database 202. Once the devices are discovered or manually entered, they are associated to the appropriate subscriber account at the presence database 202.

Based on the type of device, it may be placed within the "mobile device" pool or the "static device" pool. Additionally, the software resident on the device will be indicative of whether the device is to be classified as a "video consumption device". Moreover, when new software is installed or software is deleted from each device, the system is configured to reclassify the device. For example, if the WatchTV application is newly installed and configured on a particular device, that device is reclassified as a "video consumption device". Additionally, devices may be classified as "web browsing devices" based on the capabilities thereof.

When a device is classified as a "mobile device", a randomly selected individual identifier is attached to the device. The individual identifier may be associated with members of the household manually (via an interface or GUI), or may be assigned automatically based on an association of the device to other mobile devices (having pre-assigned individual identifiers), which are geographically proximate (i.e., assign a probability that these devices are actually the same user). In one specific example, two identified devices may be within 10 feet of each other at all times when the devices are outside of the home; accordingly, it is likely they are operated by the same individual and are given the same individual identifier. When the probability reaches a certain threshold, a new "super individual identifier" may be created to accommodate more than one device in one variant. Additional devices may be added to the super individual identifier in the manner described above as necessary.

When a device is classified as static, the device is assigned a known descriptor (e.g., settop box, HVAC, lighting, security, window shades, etc.). Additionally, for each static device a sub-device type, manufacturer, API, etc. are used to determine the parameters which can be monitored and/or controlled programmatically. For example, for a certain manufacturer of HVAC systems, it may be possible to monitor the current temperature setting, along with the actual temperature reading, it may also be able to monitor whether the fan is set to "ON" or to "AUTO", it may be possible to monitor whether the heating system or AC system is set to "ON". However, it may only be possible to programmatically set the temperature setting. When a device is classified as a mobile device, a manufacturer, API, etc. are used to determine the parameters which can be monitored and/or controlled programmatically. For example, for a certain manufacturer, mobile device software version, etc. it may be possible to locate the device (lat/lon/elevation). Such discovery of the capabilities of the mobile and/or static devices may be accomplished through either lookup based on manufacturer/software/etc. against reference data, or through direct interrogation of the device (e.g. attempt to execute interfaces defined in specific APIs, etc.)

Next, for each super individual identifier, the location of that identifier is tracked over time. Additionally, the time, location and consumption pattern is tracked over time. The tracked time and location are used to predict when the super individual identifier will be at particular locations (such as "home") as discussed elsewhere herein, and further predict how many super individual identifiers will be at home at a given time as also discussed elsewhere.

With respect to the device parameters that can be controlled programmatically, the value of the controllable parameters is tracked over time and over all available monitored parameters across all devices. Over the time available, the correlation amongst each of the monitored parameters across all devices are examined and those values that have a low correlation are selected. A statistical model may then be built from amongst the parameters to predict the value of the controlled parameter. Additionally, based on a predicted time of the super individual identity at home at a given time, certain ones of the controllable parameters are adjusted automatically (light level, HVAC level, favorite channels, etc.).

Moreover, each super individual identifier is anonymized (as discussed elsewhere herein). Time location and consumption pattern records are collected and sent to a network entity. For each location, a type thereof is identified based on geographic data (e.g. school, office, grocery store, etc.). Based on time, inferred type of location, travel patterns, and consumption patterns, super individual identifiers are broadly characterized, e.g., as Male Adult, Female Adult, Male High Schooler, Female High Schooler, Male Middle Schooler, Female Middle Schooler, Male Elementary Schooler, Female Elementary Schooler, etc. Depending on quality of clustering, other demographic traits may be included in the grouping (inferred age, household income, etc.). Finally, the counts of clusters (as appropriate depending on age, etc.) may be published to an addressable advertising system, along with estimated available impressions across advertising types (display, video) based on consumption patterns and type of location.

Figure 4:
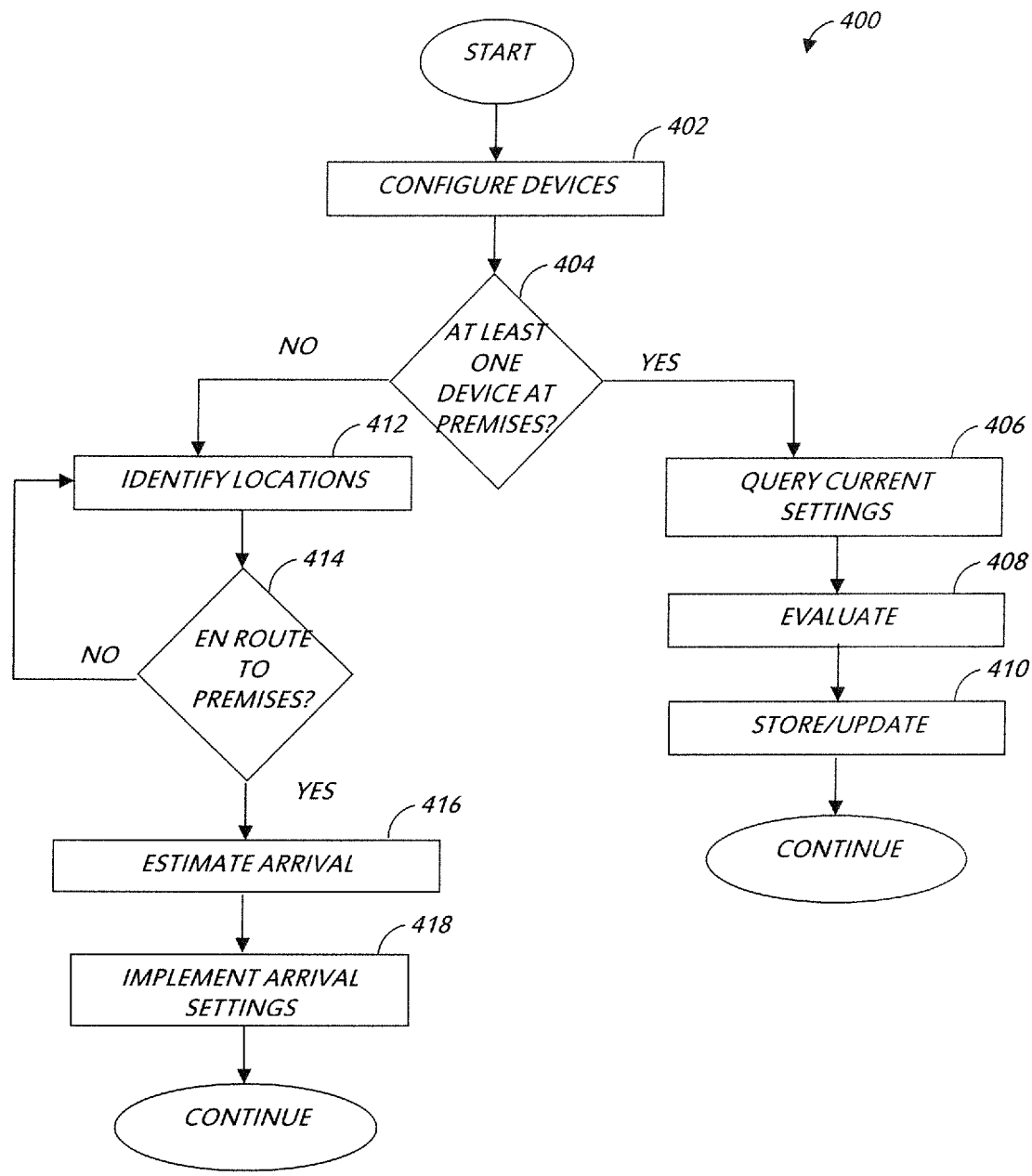
FIG. 4 is a logical flow diagram illustrating another exemplary embodiment of a method for enabling presence-based services.

FIG. 4 is a logical flow diagram illustrating another exemplary embodiment of a method 400 for enabling presence-based services. The method 400 of FIG. 4 is used to collect signals from home utilities and entertainment appliances to create personal, shared and family environmental settings. In addition, the method 400 of FIG. 4 may be utilized to collect signals from office utilities and entertainment appliances to optimize work environment. Data is collected through device 106 opt-in mode and propensity scored to customize utility and entertainment environments as well better target messages across an unwired delivery network.

According to this embodiment, the devices are first configured at step 402. Configuration of the devices may include e.g., associating a plurality of client devices 102 to a premises and/or to a particular user sub-profile within the premises (as discussed above).

In addition, with respect to other premises devices, such as e.g., HVAC, smart televisions, home audio equipment, automated lighting devices, home security devices, and other smart home equipment, the user may enter an identity of the device and/or an identity thereof may be derived and in one embodiment confirmed by the user. For example, the devices may be assigned qualifiers such as "air conditioner", "kitchen lights", "family room television", "front porch lights", "master bedroom television", etc.

The device configurations are then stored at a storage entity in communication with the presence database 202 and/or evaluation entity 204.

Next, per step 404 it is determined whether at least one client device 106 is within the premises. It is noted that the premises may include, e.g., a home, apartment building, office suite, etc. The presence of the client devices 106 within the premises 206 may be determined, as noted above, based on latitude/longitude/elevation information obtained therefrom and/or beamforming or other such techniques, such as to determine a specific location of a device 106 within a premises (such as which room of a house the device 106 is in). In an alternative embodiment, data may be obtained regarding when the client device 106 joins the premises Wi-Fi network and used to determine the presence of the device 106 within the premises 206.

When at least one device is present within the premises, the system queries the current settings of the fixed premises devices, such as the HVAC, smart televisions, home security, automated devices, etc. (step 406), and evaluates the data received in response (step 408).

The queries (step 406) may occur on a regular basis (periodically) so that a profile may be built which associates particular devices 106 being present in the premises to particular settings of the fixed devices. In other words, the data may be evaluated at step 408 to identify the particular settings of the fixed devices when a particular user or group of users is in the premises. For example, when the device 106 associated to Dad is the only device in the premises, the HVAC devices report cooler temperatures than when devices 106 associate to both Mom and Dad are in the premises. Moreover, the televisions in the children's bedrooms may be on when only the children's devices 106 are in the premises, however televisions in a family room may be turned on instead when all family members are home. Parental controls and viewing patterns may also be evaluated based on the devices 106 within the home as well. The foregoing evaluations may further take into account time of day, day of week, season of the year, etc.

The evaluated data is stored at step 410. The stored presence data may be used as discussed elsewhere herein.

When it is determined that no devices are within a premises, the evaluation entity 204 may implement one or more energy saving mechanisms. For example, the system may query the current settings of the fixed devices and if any are determined to be on (such as lights, televisions, etc.) or operating outside of a predetermined range (such as air conditioners), they may be instructed to cease operations or adjust to a more energy efficient range.

Additionally, when it is determined that no devices are within a premises, the presence database 202, evaluation entity 204 and/or gateway 109 or other device may determine a location of one or more of the devices 106 (step 412) such as via the method described above with respect to FIG. 3.

Per step 414 it is determined whether any of the devices 106 is en route to the premises. If not, the location of the devices 106 continues to be monitored. In the event that one or more devices 106 are on a trajectory leading to the premises or have an established pattern of returning to the premises at the given date/time, an arrival time is estimated (step 416). The arrival time may be estimated using e.g., known patterns used to arrive at home (i.e., which freeways and streets the user generally takes) and real-time traffic information, as well as other known patterns of behavior (such as that the user generally doesn't leave work until 5 pm, the user generally stops to pick up children at school, etc.

Based on the estimated arrival time, arrival settings are implemented (step 418). That is, when it is known that Dad is on his way home, the appropriate air conditioning, lighting, and television settings are implemented in time for his arrival. If, for example, it will take Dad 20 minutes to arrive at home, and it is known that at least 10 minutes are needed to cool the house to Dad's preferred temperature, the system may cause the air conditioning unit to turn on and set to the appropriate temperature at least 10 minutes before his estimated arrival. Similar logic may be applied to instantiating the user or group of user's preferred lighting, television, etc. settings; including, in one embodiment causing preferred channels or programs to be automatically turned on when the user's device enters the premises. It is further appreciated that in one embediment, the user may manually set one or more preferences to be instantiated prior to his/her arrival.

In this manner, a person may enter a premises with a powered device 106 which connects to the premises network 206 and causes utility and entertainment platforms to automatically customize to the user's preferences. For example, television program "favorites" may be shown on the preferred television display; content recommended and/or predicted for viewing by the particular user may be displayed on the preferred television display; lighting may be customized to preferred or prior settings; cross platform web favorites may be set for the particular user (such as to transition from mobile browsing to PC, smart television or other device, laptop, or tablet browsing; and temperature may be adjusted to preferred or past settings.

When it is known which particular users are within the premises, advertising solutions may advantageously be further customized. For example, cross platform advertising may be displayed and optimized on a preferred television display such that a user who was recently browsing a BMW® website may, upon entering the premises, see a BMW® or other luxury automaker advertisement on their living room television. Moreover, presence profiles may be created for individual and/or shared presence in the home. For example, when it is determined that only the sole adult male is in the premises, the television favorites may be set to Speed, Military and ESPN®, and the lights and air conditioning or heat powered in e.g., the "man cave". When it is determined that a child is also en route or present, certain televisions may be switched to adjusted favorites (e.g., PG13) and additional rooms or floors may be lit, heated or cooled as necessary. In addition, when it is known which devices are present within a premises, the advertisements provided thereto may be tailored to that particular demographic.

Similar mechanisms may be utilized when the premises 206 comprises a workplace or office. Specifically, when a worker enters the office building or premises (as evidenced by the determined location of the device 106 and/or by the device 106 accessing the premises network 206), information collected from the various so-called "smart" devices in the premises is used to set the custom settings thereof for the worker. The smart devices may comprise utility and entertainment platforms as well as in office computers, etc. For example, when the user enters the office, the presence database 202 and/or evaluation entity 204 may use the worker's presence to ensure that network bandwidth is optimized for the number of users currently in the office. Lighting and temperature settings may also be adjusted to that user's preferences.

Exemplary Use-Based Services Methods—

Figure 5:
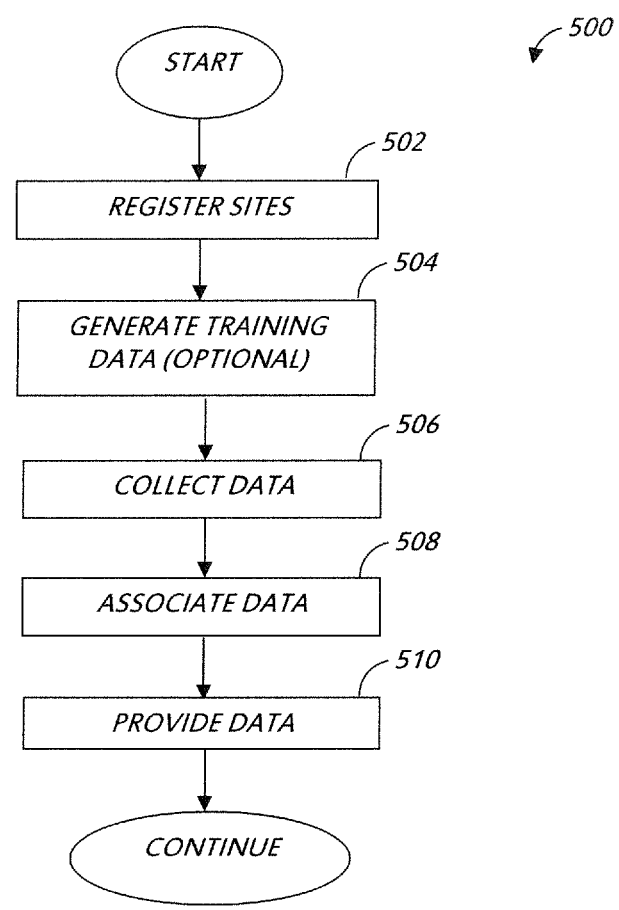
FIG. 5 is a logical flow diagram illustrating an exemplary embodiment of a method for enabling use-based services.

FIG. 5 is a logical flow diagram illustrating an exemplary embodiment of a method 500 for enabling use-based services. The method 500 may be used for example to collect explicit behavior on third party sites which have aligned to the managed network 101 (online I/C and/or Publisher Direct) including web browsing, online social interactions, and e-commerce across desktop and mobile devices 106. Online I/C is a means by which the MSO represents other multi-channel video programming distributor (MVPD) inventory; Publisher Direct is a means by which the MSO represents inventory from $3^{rd}$ party publishers (on an exclusive and non-exclusive basis).

As illustrated, per step 502, one or more websites are registered to the managed network 101. This is accomplished, in one variant, via registration by a content owner of his or her website with the MSO as part of a business arrangement.

Optionally, for each website which is registered or represented, a "special" device is designated with a specific device identifier. The MSO network 101 or entity at the registered third party (content owner) runs the special device to generate training data (step 504; optional). A user of the designated special device executes every click possible on the represented website, and an application (such as one running at the evaluation entity 204) "sees" the entry associated with that activity in the storage and presents the transaction in the application, along with a recommended "action", allowing the user to either "confirm" the recommended action associated with the mouse click or to enter a more appropriate action. In this manner, the system becomes aware of every possible action which may be taken when traversing the website and can use this as reference data when a device 106 interacts therewith and data is collected about the device 106 activity.

Next, per step 506, data is collected regarding a user's actual interaction with the website. In one exemplary embodiment, instrument websites pass device identifier information for each device 106 which is interacting therewith to a central server for each mouse click in the context of the website, along with metadata about the activity of the user. For each mouse click, the web page, the unique device identifier, and the context of the click (metadata relevant to the specific web-site), based on content, type of information entered around the click, inferred action (e.g. begin purchase process, filter through purchase process, exit purchase process, complete purchase process, click on ad, click on detail about specific content) is stored.

The collected data is associated to a particular user in the content based network (step 508). In one embodiment, this is manually accomplished by the user of the client device. Alternatively, the aforementioned patterns are used to establish an identity of the device and the identity is later used during the association step (step 508).

Per step 510, the stored data is provided for use in one or more applications by the content owner or a network entity. In one variant, the data is provided to content owner via a portal that delivers detailed accounts of user experience on websites, allowing owners to examine general demographic traits of the users (taken from the Presence Database, associated with the device identifier), as discussed elsewhere herein.

Figure 6:
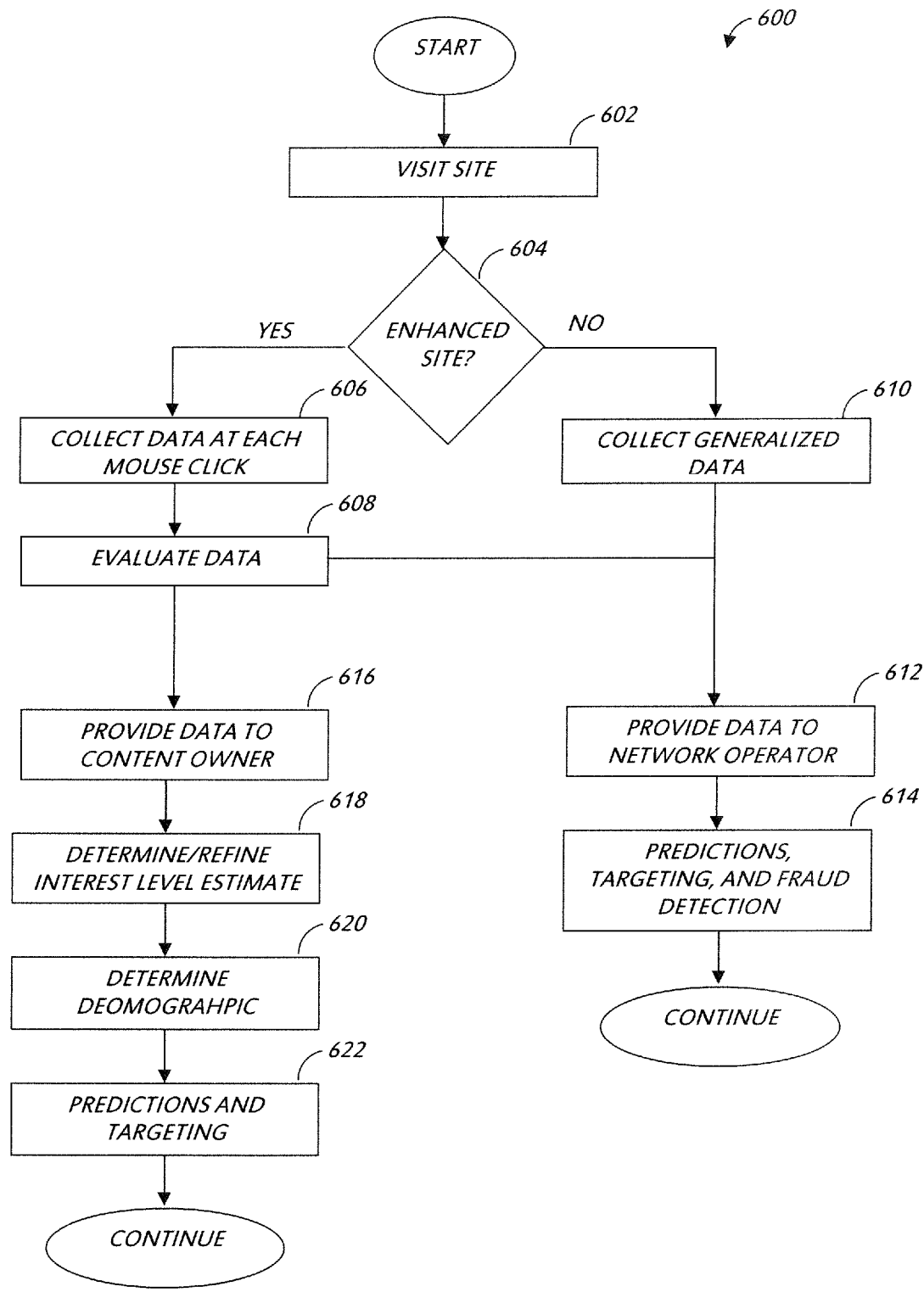
FIG. 6 is a logical flow diagram illustrating another exemplary embodiment of a method for enabling use-based services.

Referring now to FIG. 6, an exemplary method 600 for enabling use-based services is illustrated. The illustrated method depicts one embodiment for fusing data collected from user interaction with registered websites with television consumption, and information in the previously disclosed presence database 202. In one variant, the individual and shared profiles aid in powering advertisement insertion and/or content engines including but not limited to Online Interconnect, QAM Video, IPTV, Mobile, Web Exchanges, Social, Demand Side Platforms.

Per step 602, while browsing the web, a user visits a site via a user device 106. Per step 604, it is determined whether the visited site comprises an enhanced (e.g., represented or MSO registered site).

When the visited site does not comprise an enhanced site, generalized information may be collected (step 610). For example, the network 101 may keep track of the number of visits to the non-registered site and other relevant information (such as demographics, etc.) and use this information to advertise the herein described services to the content owner.

In the instance the visited site comprises an enhanced or registered site, per step 606, data is collected regarding each mouse click performed by the user with respect to the site. As noted above with respect to FIG. 5, the collected data is stored along with a device identifier and other information describing the activity taken. In other words, a user browses the web (via a user device 106) and whenever they visit a represented site, their experience is enhanced from a content, advertising and commerce perspective by tapping into the presence database 202 and profile generation as discussed elsewhere herein.

Per step 608, the data is evaluated for example, to link the data to specific profiles (such as using the herein described presence database 202 and/or evaluation entity 204). In one embodiment, a double blind match is executed and customized elements are displayed. Additionally, the data collection step further improves the audience profile generation discussed elsewhere herein. One or more patterns are also identified within the data at this step and/or at subsequent steps relating to the content owner or network operator performed evaluation, as discussed elsewhere herein. In one variant, the foregoing evaluations occur via a "cookieless" mechanism; that is, the appropriate profile is identified based on an identifier of the device (transmitted in a data record) and/or other network-powered methods. In another example, the system may comprise managed sites and/or may provide tracking pixels.

The data is then provided to both the content owner and the network operator at steps 616 and 612.

The network operator, upon receiving the collected data (step 612), performs one or more evaluations of the data. Specifically, as outlined in FIG. 6, the network operator, at step 614, uses the collected data to make predictions, target primary and secondary content, and for fraud detection.

Content predictions or recommendations are enabled by using data collected from the user's interaction with a web site to further enhance that user's profile. As the profile is updated, it may be used e.g., to compare against metadata relating to primary content. The proximity of a match between a demographic of content and the user's profile is then used to identify certain content as being likely to be of interest to the user. The identified content may then be provided to the user. In another embodiment, the methods and apparatus of co-owned U.S. patent application Ser. No. 12/414,576, filed on Mar. 30, 2009, entitled "RECOMMENDATION ENGINE APPARATUS AND METHODS", and issued as U.S. Pat. No. 9,215,423 on Dec. 15, 2015, which is incorporated herein by reference in its entirety may be utilized. Methods and apparatus for the identification and recommendation of content targeted to a particular user (or group of users) within a content-based network are disclosed therein. As discussed, a mechanism for particularly selecting content to align with a user's preferences (the latter which the viewer need not enter manually) is provided. Additionally, a mechanism is provided to learn (and unlearn) the user's preferences and which content they are likely to enjoy based on actions taken with regard to the content. The recommended content may be displayed in one embodiment as a list or table of titles (and related information of interest), or alternatively fed to the user as a continuous content stream on a virtual channel. In another embodiment, the compiled content is presented to the user in conjunction with an electronic program guide (EPG) which may be personalized to that user if desired. In a further aspect, client applications are utilized to compile the playlist based on user-imputed as well as pre-programmed user profiles. Various feedback mechanisms are utilized to enable the client application to "learn" from the user's activities in order to update the user profile, and generate more finely tuned recommendations over time. The herein described recommendation engine may be provided within the functionality of the presence database 202 and/or evaluation entity 204 located either at the managed network 101 or premises 206.

Targeted primary and/or secondary content may also be provided using the updated profile in a manner similar to that described above with respect to the foregoing recommendation concepts. One method for the delivery of secondary content which is contextually-related to particular primary content selected by the user and/or by the recommendation engine or evaluation entity 204 (discussed above) is described in co-owned U.S. patent application Ser. No. 11/198,620, filed Aug. 4, 2005, entitled "METHOD AND APPARATUS FOR CONTEXT-SPECIFIC CONTENT DELIVERY", and issued as U.S. Pat. No. 9,286,388 on Mar. 15, 2016, which is incorporated herein by reference in its entirety. Specifically, secondary content comprising advertising is selected at least in part based on metadata associated with the primary content. The metadata is provided by, e.g., the content originator or network operator, and is sent to a third party network entity (e.g., advertising server) which returns contextually specific advertising matching the search terms. In one variant, the search term is simply one or more keywords drawn from the metadata and used as an input to a search engine (such as the aforementioned recommendation engine or evaluation entity 204). In another variant, more sophisticated analysis of the metadata is performed so as to ostensibly reduce the number of irrelevant or marginally relevant "hits" returned by the search engine/advertising server.

Another method of enhanced secondary content selection useful with various aspects of the present disclosure is described in co-owned U.S. patent application Ser. No. 12/070,559, filed Feb. 19, 2008, entitled "METHOD AND APPARATUS FOR ENHANCED ADVERTISING AND PROMOTIONAL DELIVERY IN A NETWORK", and issued as U.S. Pat. No. 9,503,961 on Nov. 22, 2016, which is incorporated herein by reference in its entirety. Specifically, the application discusses a substantially user-friendly mechanism for viewing content and advertisements which both eliminates the guess-work and imprecision associated with skipping commercials via manual fast-forwarding through recorded content, and presents a viewer with options regarding the type and content of advertisements to view. Advertisers and network operators are also provided with more avenues for reaching subscribers with advertising or promotional content.

In another exemplary embodiment, the methods and apparatus of co-owned, co-pending U.S. patent Ser. No. 14/462,300, filed Aug. 18, 2014 and entitled "METHODS AND APPARATUS FOR TARGETED SECONDARY CONTENT INSERTION" which is incorporated herein by reference in its entirety may be utilized. As discussed therein, content is identified for insertion by analyzing audience or viewer qualities (i.e., psychographic, geographic, or demographic, characteristic or classifications) at a particular insertion opportunity using an advertisement management system (and associated advertisement decision maker process) which may be run at e.g., the presence database 202 and/or evaluation entity 204. The audience information can in one embodiment be gathered in real-time directly from users' CPE (i.e. set top boxes, cable modems, PC, etc.), thereby allowing information to be gathered which is specific to actual content viewers. Historical or other information relating to particular subscribers (or subscribers in general, or even the broader general population) may also be utilized in characterizing an audience.

The advertisement management system then, in one embodiment, uses the gathered audience information to correlate particular advertisements or other content thereto. In one variant, an algorithm is used to analyze audience qualifiers (i.e., attributes of an audience or its behavior), and determine the "proximity" of a given audience (e.g., that currently viewing a program where an impending placement opportunity will occur) to a set of audience qualifiers of a target audience of an advertisement. The placement opportunity can then be optimized for one or more variables (e.g., proximity, revenue, impressions, etc.) by selecting the best fitting advertisement for that opportunity.

The aforementioned methods and apparatus can advantageously provide content across multiple delivery platforms utilizing substantially extant network infrastructure and components compatible with a number of different client device and delivery systems including both wired and wireless technologies.

Subscriber privacy and anonymity is also optionally maintained via e.g., hashing or encrypting data relating to the CPE and/or subscriber, thus ensuring that stored data is not traceable to a specific user account. In alternative embodiments, only information designated by a consumer is eligible for content collection and/or analysis. In this manner, subscriber privacy is effectively safeguarded, and user control of their private information (including for example preferences or user profile) is protected as well.

In addition, the user may also advantageously be given control over the "fine tuning" of the secondary content evaluation and recommendation algorithms. For instance, co-owned U.S. patent application Ser. No. 12/284,757 entitled "METHODS AND APPARATUS FOR USER-BASED TARGETED CONTENT DELIVERY" filed Sep. 24, 2008, and issued as U.S. Pat. No. 9,071,859 on Jun. 30, 2015, incorporated herein by reference in its entirety, describes inter alia methods and apparatus for intra-content context-specific advertising placement useful with the present disclosure. Using this approach, targeted secondary content can be placed within particular portions of the primary content so as to most closely temporally align the contextually-related aspects of the advertisement and the primary content.

In this manner, advertisements delivered in online I/C and or Publisher Direct can employ viewability metrics as part of enabled campaign and stored as data fields in an audience profile (e.g. be able to determine whether users that visit soccer sites, visit sites with less viewable display and/or video).

In one specific example, when a page load occurs, and there is an advertisement opportunity, the device 106 identifier is determined and demographics and/or identity (such as e.g., Dad, Mom, Teen Daughter, etc.) are obtained from the presence database 202. Advertisement insertion decisions are made based on outstanding campaigns and possible return on investment or other cost/revenue based analysis. For example, the following rules may be implemented:

if an advertisement is targeted to specific individuals (e.g. match list from investment house, etc.), and the device identifier of the user who is browsing is associated with such an individual, mark this possibility as high priority;

if an advertisement is targeted to a specific psychographic (e.g. intent to purchase home in next 6 months), and the device identifier of the user who is browsing is associated with such an individual, mark this possibility as medium priority;

if an advertisement is targeted to a specific demographic (e.g. upper income single female), and the device identifier of the user who is browsing is associated with such an individual, mark this possibility as low priority; and/or if an advertisement is targeted to a specific demographic and the device identifier of the user who is browsing is associated with an individual who is "close" (as defined in the campaign specification—e.g. can be flexible on income, but must be female), mark this possibility as extra-low priority.

Next, the following are implemented:

for each campaign marked with any priority from extra-low to high, examine CPM and multiply priority by the cost per mile (CPM) or the way that impressions are typically priced (e.g., a $20 CPM means it costs $20 to deliver an impression 1,000 times;

for each campaign marked thus, take the remaining impressions required for delivery and device that by the number of days remaining in the campaign and multiply that number times the previous step; and insert the advertisement having the highest number.

Fraud can be detected by the evaluation entity 204 or other network apparatus using normative filtering based on, e.g., volume of traffic (e.g. to determine wither the volume is relatively normal for an individual) to "authenticate" or validate number of concurrent keystrokes, requests, inputs, etc. For example, when any single device generates 3 times the standard deviation above the mean in "clicks" for a specific webpage, that device is marked as "fraudulent" and is removed from targeting. Additionally, the content owner, household, subscriber, and/or device 106 owner may be notified of the fraudulent device such as by email or other alert.

In addition, the foregoing collection and evaluation stages (steps 606 and 608) may be performed even when the site is determined not to be enhanced at step 604. In this instance, rather than providing the data to the content owner, the data may only be provided to the network operator. Once again, the network operator may utilize this data as discussed above (step 614).

The content owner, upon receiving the collected data (step 616) proceeds to evaluate the data. In one embodiment, the content owner is provided with an API or other interface for allowing dynamic loading of content based on the identifier device 106 being used to browse the site and a demonstrated level of interest in that type of content.

Hence, at step 618, the content owner determines an interest level estimate and/or refines an existing interest level estimate. In one embodiment, this is accomplished via a classification of a context of an advertisement. Based on length of time that content with specific classification is loaded and actively manipulated (if such interaction is possible given the device and context), the interest for this content for the specific device 106 is determined.

Over time, the amount of data collected for a particular device increases, accordingly, at step 618, the content owner may further refine interest inference by taking average time spent/click throughs on all content versus that for this content, etc.

Next, at step 620, the demographics of people viewing this content may be determined. A model can then be built which predicts an affinity for this content type in the future.

Once the interest level estimate and the demographics are determined, at step 622, this information may be used to predict content of interest to a user and/or provide targeted content to a user. In one example, when a user loads a webpage enabled with dynamic content on a known device, based on that particular device's history, content may be loaded which is most likely to be of interest to the user. When a user load a webpage enabled with dynamic content on an unknown device (but one for which the presence database 202 has an entry or profile for), based on the demographic associated with the device, content may be loaded which is most likely to be of interest to the user. Additionally, when a totally unknown device loads a webpage enabled with dynamic content, based on the predominant demographics of people on that device type (if known) at that time of day in that geography (if known), content which is most likely to be of interest to the user may be loaded.

Exemplary Premises Database—

Figure 7:
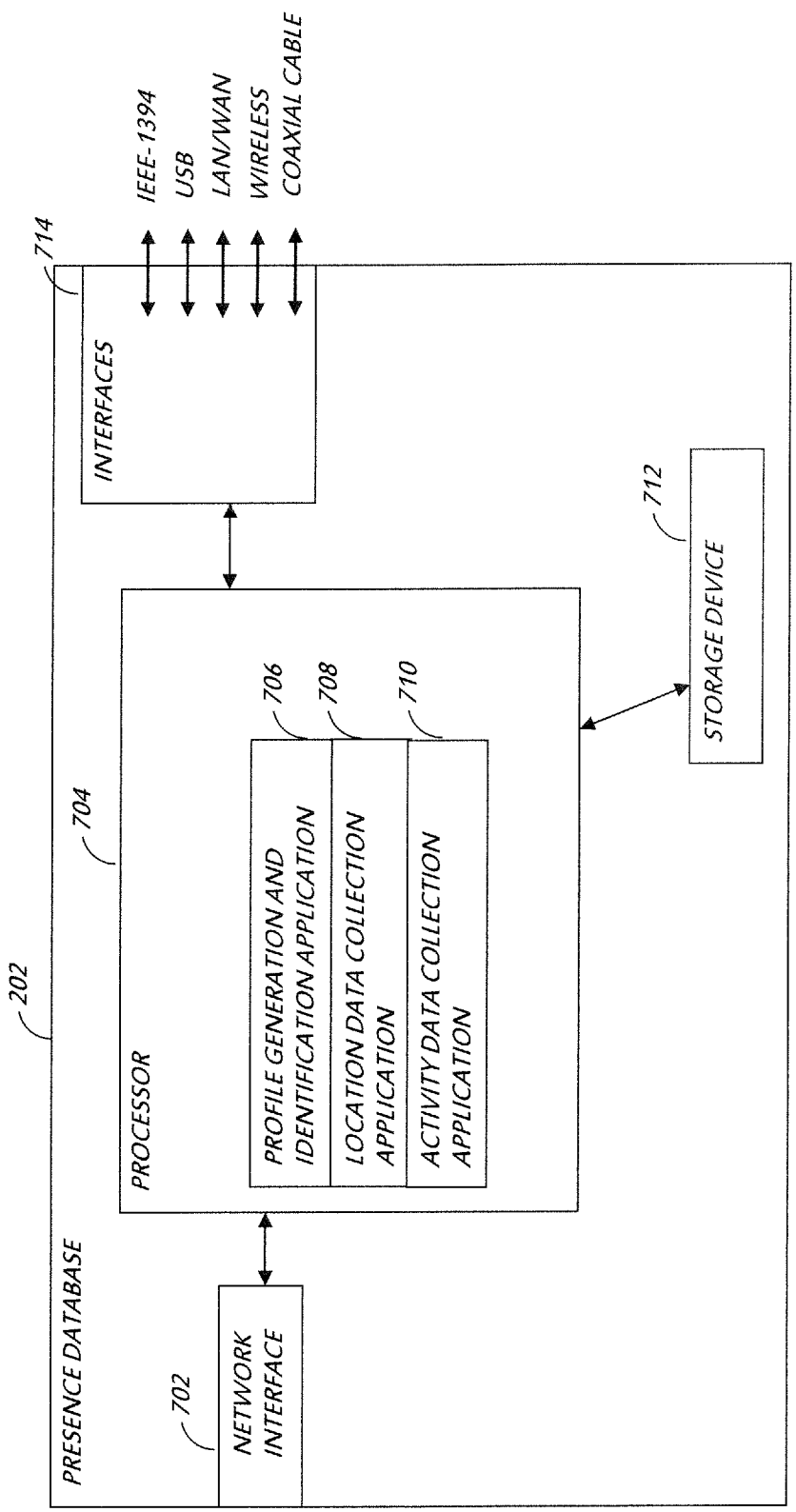
FIG. 7 is a block diagram illustrating an exemplary embodiment of a presence database for use in providing presence-based and/or use-based services.

FIG. 7 is a block diagram illustrating an exemplary embodiment of a presence database 202 configured for use in providing presence-based and/or use-based services. As shown, the presence database 202 generally comprises a network interface 702, a backend interface 714, a processor 704, and an associated storage device 712.

In the illustrated embodiment, the processor 704 is configured to run at least a profile generation and identification application 706 and a location correlation application 708 thereon, although other software/logic architectures may readily be substituted.

The profile generation and identification application 706 is a computer application configured to generate individual device profiles. As discussed above, the profiles may be generated automatically using information inferred from patterns of behavior, and/or supplemented with user inputted information. The application 706 is advantageously utilized to, when data is received relating to subsequent locations and/or activities of a particular device, use a unique device identifier attached to the data to correlate the data to one of the device profiles. As discussed previously, the individual device profiles comprise a plurality of data relating to a location of the device (within and outside of a premises) and browsing data.

The location correlation application 708 is in one embodiment configured to associate a qualifier (e.g., name) to the locations which the devices 106 are determined to be located. As indicated above, the locations are identified by GPS or other data indicating a latitude/longitude/elevation. The location correlation application 708 associates the raw latitude/longitude/elevation data received to a particular location based on an information look-up and/or manual confirmation by a user. One or more profiles are therefore associated, via the location correlation application 708, to a specific location. For example, the locations may be assigned qualifiers such as "kitchen", "family room", "dining room", "bedroom", "Dad's work", "Teen Daughter's School", etc. In addition, the location assignment may cover a range of data coordinates extracted from multiple profiles which were used to determine an overall space that is to be considered associated to a particular location and/or based on an acceptable radius for that type of location.

One or more additional applications or modules may be provided to, inter alia, enable a user to manually correct an incorrectly identified device location, and subsequently store an updated device profile and location assignment. Additionally, applications or modules may be provided to enable the presence database 202 to "learn" locations as entered by a user as discussed above.

A network interface 702 and backend interfaces 714 are further illustrated. The network interface 702 is in the exemplary embodiment configured to provide content and data delivery to and from the MSO network 101 and/or from an unmanaged network 111. The backend interfaces 714 provide communication between the presence database 202 and various devices within a premises 206 and/or at the headend, such as e.g., client mobile devices 106, fixed or smart devices, the evaluation entity 204, and/or other headend entities. Communication between the client devices 106 and interfaces 714 may occur via a wired or wireless communication therewith, such as via e.g., IEEE-1394 (so called "FireWire"), USB, LAN/WAN, Wireless, HDTV, NTSC, etc. communications.

Exemplary Evaluation Entity—

Figure 8:
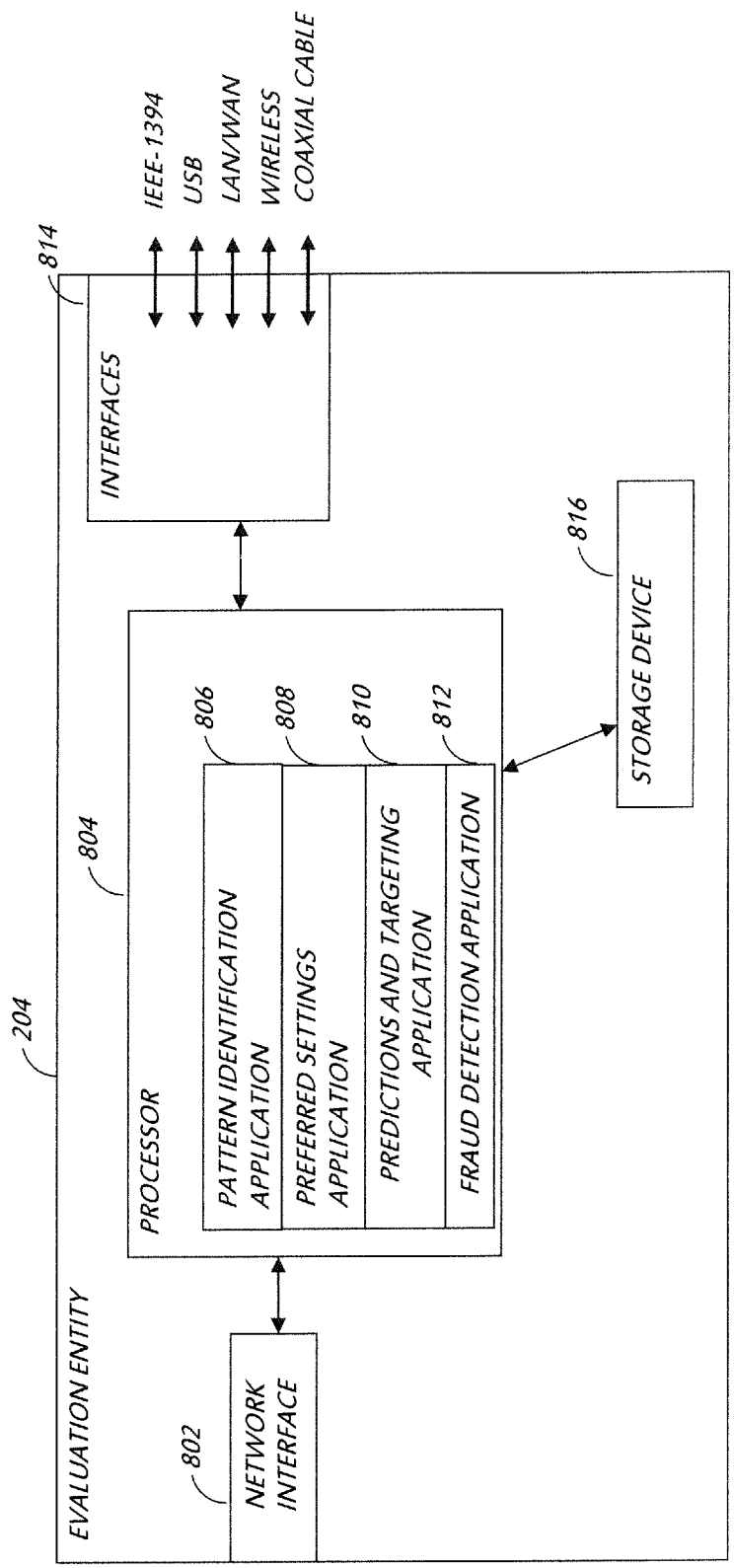
FIG. 8 is a block diagram illustrating an exemplary embodiment of an evaluation entity for use in providing presence-based and/or use-based services.

FIG. 8 is a block diagram illustrating an exemplary embodiment of an evaluation entity 204 for use in providing presence-based and/or use-based services. As shown, the device generally comprises a network interface 802, backend interfaces 814, a processor 804, and associated storage 816.

The network interface 802 enables communication of the evaluation entity 204 to the managed network 101. The backend interfaces 814 provide, inter alia, communication between the evaluation entity 204 and various devices within a premises, such as e.g., client mobile devices 106, fixed or "smart" home devices, the premises database 202, etc.

In the illustrated embodiment, the processor 804 is configured to run at least a pattern identification application 806, a preferred settings application 808, a prediction and targeting application 810, and a fraud detection application 812 thereon.

The pattern identification application 806 comprises software which enables data collected regarding a particular user or group of users to be compiled and examined to determine one or more patterns therein. In the examples listed above for providing location and/or use-based services (discussed above with respect to FIGS. 3-6), the pattern identification application 806 may be utilized to identify within the collected data patterns relating to use. For example, it may be determined based on patterns of locations that a particular device 106 belongs to a particular household member. Additionally, it may be determined that a particular device 106 often frequents a set pattern of locations on a given day of the week, time of day, etc. Further, the pattern identification application 806 may be used to determine patterns among groups of users. For example, it may be determined that a certain demographic visits particular locations at a given time of day/day of week.

In yet another embodiment, the pattern identification application 806 is configured to analyze location and/or use information from the device 106 over time in order to generate one or more rules. One rule, for example may indicate which locations within a premises are near one another and then utilize that rule to estimate or predict movement between locations within the premises. Similar logic may be applied to e.g., large commercial buildings with multiple stores, etc. Additionally, the derived rules may identify e.g., a pattern of never viewing video clips during certain hours of the day (such as during work hours), and therefore provide only non-video content for insertion during this time. Other patterns of behaviors based on location and/or use may also be derived.

The preferred settings application 808 comprises software which enables a particular user or group of users' preferred settings to be implemented when the user or group of users is at or near a premises (such as work or home). In the examples listed above for providing location and/or use-based services (discussed above with respect to FIGS. 3-6), the preferred settings application 808 may be utilized by collecting information relating to the setting of so-called "smart" devices within a home or other premises. That is, devices with an appropriate API to communicate to the evaluation entity 204 provide, in response to a query and/or periodically, current settings thereof. For example, an air conditioning unit may provide current temperature information which the preferred settings application 808 utilizes to determine a preferred temperature when a particular user or group of users is in the premises. Similar logic is applied to the other "smart" devices within a home, such as lighting, television (so as to determine preferred programs, channels, etc.), etc.

The prediction and targeting application 810 comprises software which enables the evaluation entity 204 to predict content of interest to a user and/or provide targeted content thereto. In the examples listed above for providing location and/or use-based services (discussed above with respect to FIGS. 3-6), the prediction and targeting application 810 may be utilized to, access profiles generated by the preference database 202 an use information contained therein to correlate to metadata relating to content for insertion. As noted above, the prediction and targeting application 810 may utilize a so-called "recommendation engine" or other algorithms for determining which content most closely correlates to a particular user's profile and/or meets a threshold level of correlation so as to be inserted.

The fraud detection application 812 comprises software which enables the evaluation entity 204 to determine whether use activity occurring via a particular user device 106 is fraudulent. In the examples listed above for providing location and/or use-based services (discussed above with respect to FIGS. 3-6), the fraud detection application 812 may provide normative filtering based on volume of traffic (e.g. to determine wither the volume is relatively normal for an individual) to "authenticate" or validate number of concurrent keystrokes, requests, inputs, etc. In one example, the fraud detection application 812 may be configured to determining when any single device 106 generates 3 times the standard deviation above the mean in "clicks" for a specific webpage. The application 812 then marks the device as "fraudulent" and removes the device 106 from targeting as well as provides an alert to the content owner, household, subscriber, and/or device 106 owner.

Exemplary Applications and Implementations—

The herein described apparatus and methods may advantageously be used to provide location and/or use-based services in any number of different use cases or scenarios.

In one such case, the location-based services include services which enable particular applications and/or content to be automatically loaded or provided when the user enters a particular location (e.g., a particular room in their house, a particular store, etc.) or a context (e.g., business versus personal).

In another variant, an application is run on a client mobile device 106 which is configured to, when it is informed by the presence database 202 of the location of the device 106, load particular applications or content. For example, when the device 106 receives information from the premises database 202 that the device is in the user's kitchen, a grocery shopping list and/or recipe or cooking application are loaded on the device. The device 106 may additionally load recommended content such as most recent content from a cooking-related site, programming content (such as from the Internet and/or an MSO network 101), etc. In addition, when the device location is determined to be at the grocery store, the device 106 may automatically load the list for that particular store (such as via information obtained from the premises database 202 and/or evaluation entity 204).

Moreover, the present methods and apparatus may be configured to based on the content with which the user is interacting, obtain information entered around each mouse click to infer action (e.g. begin purchase process, filter through purchase process, exit purchase process, complete purchase process, click on ad, click on detail about specific content). The inferred action is then used to provide further profile updates and/or targeting.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

It will be appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized apparatus configured to enable presence-based services to a plurality of computerized client devices of a content delivery network, the computerized apparatus comprising:
   digital processing apparatus;
   a non-transitory storage medium in data communication with the digital processing apparatus and having a plurality of instructions, the plurality of instructions configured to, when executed on the digital processing apparatus:
      obtain data relating to at least one first computerized client device and at least one second computerized client device of the plurality of computerized client devices, each of the at least one first computerized client device and the at least one second computerized client device associated with one subscriber account associated with the content delivery network;
      utilize the obtained data to determine that (i) the at least one first computerized client device is a mobile device and (ii) the at least one second computerized client device is a premises device;
      based on the determination, assign an identifier to the at least one first computerized client device;
      cause monitoring of at least one of movement or locations associated with the identifier;
      identify a specific location associated with the at least one second computerized client device;
      based at least on the monitoring, predict (i) a presence or absence of the at least one first computerized client device at a specific location and (ii) a time associated with the presence or absence of the at least one first computerized client device at the specific location; and
      at a specific time, cause a change to one or more parameters of the at least one second computerized client device, wherein the causation of the change is based at least on the predicted presence or absence of the at least one first computerized client device at the specific location, wherein the specific time comprises a predetermined time prior to the predicted time of the at least one first computerized client device at the specific location.

2. The computerized apparatus of claim 1, wherein the plurality of instructions are further configured to, when executed on the digital processing apparatus:
   utilize the obtained data to generate a user-specific profile and associate the at least one first computerized client device and the at least one second computerized client device with the user-specific profile.

3. The computerized apparatus of claim 2, wherein the obtained data comprises at least location data, and the plurality of instructions are further configured to, when executed on the digital processing apparatus, cause utilization of the location data to infer one or more characteristics of the user-specific profile.

4. The computerized apparatus of claim 2, wherein the one subscriber account associated with the content delivery network is associated with one household, and the user-specific profile is associated with a member of the one household.

5. The computerized apparatus of claim 1, wherein the plurality of instructions are further configured to, when executed on the digital processing apparatus, cause utilization of at least the predicted movement to estimate a time of arrival of the at least one first computerized user device at the specific location.

6. The computerized apparatus of claim 5, wherein the specific time comprises a predetermined time period prior to the estimated time of arrival, the predetermined time period based at least in part on a physical parameter or capability of the at least one second computerized device or a device controlled thereby.

7. A computerized method of enabling presence-based services in a content delivery network, the computerized method comprising:
   obtaining first data relating to a first computerized client device and a second computerized client device;
   based at least on the first data, assigning a first identifier to the first computerized client device and a second identifier to the second computerized client device, wherein the first and second identifiers are each associated with a probabilistic criterion, the probabilistic criterion relating to whether the first computerized client device and the second computerized client device have a common user;
   storing, at a computerized storage apparatus, second data relating to respective patterns of movement of the first computerized client device and the second computerized client device over a period of time;
   utilizing at least the second data to determine that the probabilistic criterion has been met;
   based on the determination that the probabilistic criterion has been met or exceeded, replace the first and second identifiers with a third identifier, the third identifier configured to accommodate more than one computerized device; and
   causing delivery of targeted digitally rendered content to at least one of the first computerized client device or the second computerized client device;
   wherein at least one of: (i) a selection of the targeted digitally rendered content, or (ii) the causing of the delivery of the targeted digitally rendered content, is based at least on the third identifier.

8. The computerized method of claim 7, further comprising:
   comparing the first data relating to the at least one first computerized client device and the at least one second computerized client device to a pre-populated data structure of rules;
   based on at least the comparing, determining a profile, the profile relating to the at least one first computerized client device, the at least one second computerized client device, and the first data;
   wherein each of the rules are configured to link one or more categories of activities to a numerical value, the numerical value indicative of a tendency of a user of the at least one first computerized client device to fall within a particular demographic, the tendency based on a detection of at least the one of one or more categories of activities.

9. The computerized method of claim 8, wherein the comparing the first data relating to the at least one first computerized client device and the at least one second computerized client device to the pre-populated data structure of rules comprises comparing at least one of (i) data relating to a certain number or frequency of status updates to social network websites, or (ii) data relating to picture or short video uploads to said websites, by the at least one first computerized client device and the at least one second computerized client device, to a particular age group.

10. The computerized method of claim 7, wherein the assigning of the first identifier to the first computerized client device and the second identifier to the second computerized client device comprises assigning randomly selected identifiers to the first and second computerized client devices, respectively, the randomly selected identifiers (i) indicating that the first and second computerized client devices are mobile device and (ii) utilized in a determine to initiate the storing of the second data.

11. The computerized method of claim 7, wherein the assigning of the first identifier to the first computerized client device and the second identifier to the second computerized client device comprises:
    assigning a first randomly selected identifier to the first computerized client device based at least on user input,
    assigning a second randomly selected identifier to the second computerized client device based on a geographic proximity of the first computerized client device to the second computerized client device.

12. The computerized method of claim 7, further comprising:
    tracking locations of the first and second computerized client devices; and
    determining associations between the tracked locations and the first and second identifiers, respectively;
    wherein the storing of the second data comprises storing data indicating the associations.

13. Computer readable apparatus comprising a non-transitory storage medium, the non-transitory storage medium comprising at least one computer program having a plurality of instructions, the plurality of instructions configured to, when executed on a digital processing apparatus of a network apparatus, cause the computerized network apparatus to:
    receive data relating to at least one first computerized client device and at least one second computerized client device;
    cause storage of the received data in a computerized storage device;
    based on at least a portion of the stored data, (ii) perform classification the at least one first computerized client device as belonging to the mobile device pool and (ii) perform classification of the at least one second computerized client device as belonging to the static device pool;
    based at least on the classification of the at least one first computerized client device as belonging to the mobile device pool, algorithmically evaluate the data to identify a pattern of movement associated with the at least one first computerized client device;
    cause delivery of digitally rendered content to the at least one first computerized client device;
    wherein at least one of: (i) a selection of the digitally rendered content, or (ii) the causation of the delivery of the targeted digitally rendered content, is based at least on the predicted pattern of movement.

14. The computer readable apparatus of claim 13, wherein the plurality of instructions are further configured to, when executed on the digital processing apparatus, cause the computerized network apparatus to:
    perform classification of the at least one first computerized client device as at least one of a video consumption device or a web browsing device based on software resident on the at least one computerized client device; and
    perform reclassification of the at least one first computerized client device based on at least one of (i) an installation of other software on the at least one first computerized client device, or (ii) deletion of the software resident on the at least one computerized client device.

15. The computer readable apparatus of claim 13, wherein the plurality of instructions are further configured to, when executed on the digital processing apparatus, cause the computerized network apparatus to:
    based at least on the classification of the at least one first computerized client device as belonging to the mobile device pool, assign an randomly selected identifier to the at least one first computerized client device; and
    track geographic locations associated with the randomly selected identifier over a prescribed period of time;
    wherein the algorithmic evaluation of the data to identify the pattern of movement associated with the at least one first computerized client device comprises identification of the pattern of movement based on at least one or more of the geographic locations.

16. The computer readable apparatus of claim 14, wherein the plurality of instructions are further configured to, when executed on the digital processing apparatus, cause the computerized network apparatus to:
    determine a relation between at least a portion of the geographic locations associated with the randomly selected identifier assigned to the at least one first computerized client device and at least a portion of geographic locations associated with a randomly selected identifiers assigned to another computerized client device belonging to the mobile device pool;
    based on the determination of the relation, assign a common identifier to both the at least one first computerized client device and the another computerized client device; and
    track geographic locations associated with the common identifier;
    wherein the algorithmic evaluation of the data to identify the pattern of movement associated with the at least one first computerized client device further comprises identification of the pattern of movement based on at least one or more of the geographic locations associated with the common identifier.

17. The computer readable apparatus of claim 13, wherein the plurality of instructions are further configured to, when executed on the digital processing apparatus, cause the computerized network apparatus to:
    based on the classification of the at least one second computerized client device as belonging to the static device pool, assign a prescribed descriptor to the at least one second computerized client device.

18. The computer readable apparatus of claim 17, wherein the prescribed descriptor comprises a description of a component of a heating, ventilation, and air conditioning (HVAC) system of a premises in which the at least one second computerized client device is disposed or used.

19. The computer readable apparatus of claim 13, wherein the plurality of instructions are further configured to, when executed on the digital processing apparatus, cause the computerized network apparatus to:

utilize the pattern of movement associated with the at least one first computerized client device to identify a premises and at least one recurring time period or specific time of day;

identify one or more physical parameters relating to an operational state of the at least one second computerized client device; and cause a change to the one or more physical parameters at the at least one recurring time period or specific time of day.

20. The computer readable apparatus of claim 19, wherein the causing the change to the one or more parameters comprises changing a temperature setting of the at least one second computerized client device.

* * * * *